United States Patent
Li et al.

(10) Patent No.: US 11,546,295 B2
(45) Date of Patent: Jan. 3, 2023

(54) INDUSTRIAL CONTROL SYSTEM FIREWALL MODULE

(71) Applicant: Agency for Science, Technology and Research, Singapore (SG)

(72) Inventors: Dong Li, Singapore (SG); Huaqun Guo, Singapore (SG); Jianying Zhou, Singapore (SG); Luying Zhou, Singapore (SG); Jun Wen Wong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 92 days.

(21) Appl. No.: 17/042,736

(22) PCT Filed: Mar. 28, 2019

(86) PCT No.: PCT/SG2019/050175
§ 371 (c)(1),
(2) Date: Sep. 28, 2020

(87) PCT Pub. No.: WO2019/190403
PCT Pub. Date: Oct. 3, 2019

(65) Prior Publication Data
US 2021/0099424 A1    Apr. 1, 2021

(30) Foreign Application Priority Data

Mar. 29, 2018 (SG) .............................. 10201802677S

(51) Int. Cl.
*H04L 9/40* (2022.01)
(52) U.S. Cl.
CPC ................................ *H04L 63/0227* (2013.01)
(58) Field of Classification Search
CPC .................................................. H04L 63/0227
See application file for complete search history.

(56) References Cited

U.S. PATENT DOCUMENTS

| 8,893,253 | B2 | 11/2014 | Cianfrocca |
| 10,484,334 | B1 * | 11/2019 | Lee .......................... H04L 67/30 |

(Continued)

FOREIGN PATENT DOCUMENTS

| CN | 104539600 A | 4/2015 |
| WO | WO 2016/154036 A1 | 9/2016 |

OTHER PUBLICATIONS

Zhou, L. et al., A Scheme for Lightweight SCADA Packet Authentication, *2017 23rd Asia-Pacific Conference on Communications (APCC)*, Dec. 13, 2017.

(Continued)

*Primary Examiner* — Chris Parry
*Assistant Examiner* — Steven C Nguyen
(74) *Attorney, Agent, or Firm* — Kilpatrick Townsend & Stockton LLP

(57) ABSTRACT

An industrial control system and a method of inspecting one or more communication packets in an industrial control system may be provided, the industrial control system firewall module comprising a packet accessing component configured to access a communication packet of an industrial control system; a firewall rules database, the firewall rules database configured to store one or more firewall rules; an inspection module configured to access the one or more firewall rules based on an industrial protocol associated with the communication packet; and the inspection module is further configured to perform a comprehensive inspection of all header fields and data fields of the communication packet based on the one or more firewall rules accessed based on the industrial protocol associated with the communication packet.

20 Claims, 15 Drawing Sheets

(56) References Cited

U.S. PATENT DOCUMENTS

| | | | | |
|---|---|---|---|---|
| 2011/0219035 A1* | 9/2011 | Korsunsky | ............... | G06F 21/00 |
| | | | | 707/E17.005 |
| 2013/0094376 A1* | 4/2013 | Reeves | ............... | H04L 63/1408 |
| | | | | 370/252 |
| 2013/0139247 A1* | 5/2013 | Cianfrocca | ............. | H04L 63/02 |
| | | | | 726/14 |
| 2017/0295141 A1* | 10/2017 | Thubert | ............... | H04L 63/0209 |
| 2018/0309724 A1 | 10/2018 | Kfir et al. | | |

OTHER PUBLICATIONS

International Application No. PCT/SG2019/050175 International Search Report and Written Opinion dated Mar. 10, 2019, 10 pages.

* cited by examiner

| Function Code 8 (Diagnostics) | |
|---|---|
| Indexes | No. of bytes |
| Unit ID | 1 byte (byte 0) |
| Function Code | 1 byte (byte 1) |
| Sub-Function Code | 1 byte (byte 2) |
| Function Code 15 (Write Multiple Coils) | |
| Indexes | No. of bytes |
| Unit ID | 1 byte (byte 0) |
| Function Code | 1 byte (byte 1) |
| Start address | 2 bytes (byte 2 – 3) |
| No. of addresses | 2 bytes (byte 4 – 5) |
| Byte Count | 1 byte (byte 6) |
| Write value | 2 bytes (byte 7 – 8) |

FIG. 7

INDUSTRIAL CONTROL SYSTEM FIREWALL MODULE

TECHNICAL FIELD

The present disclosure relates broadly to an industrial control system and to a method of inspecting one or more communication packets in an industrial control system.

BACKGROUND

It has been observed that Supervisory Control and Data Acquisition (SCADA) systems have evolved from traditionally using a closed internal network comprising proprietary technologies into using an open network together with an increased number of connections between a SCADA network, an enterprise network and even the Internet. It has been recognised that having relatively open networks make SCADA systems more vulnerable to various network attacks that are common threats to computer/communication security. For example, one of the vulnerabilities is unauthorised access to a SCADA control centre. Another example is a threat of fake commands to control SCADA field devices through a man-in-the-middle attack.

Communication security has therefore become a significant consideration when designing a SCADA network. The inventors have recognised that many legacy SCADA systems may leave critical infrastructure and systems vulnerable to security threats. Existing SCADA protocols also lack adequate security mechanisms for e.g. advanced SCADA application control, authentication and encryption, and commands validation, which are primary weaknesses that may be exploited in SCADA attacks.

There have been proposed a number of approaches that aim to secure SCADA systems. One of the approaches in SCADA network monitoring and filtering is the use of firewalls. In particular, the network security capabilities of firewalls have been extended to support SCADA networks or to protect related industrial environments. There are related commercial firewalls and open-source firewalls available that may be inserted for use with SCADA systems. However, despite proposal of the use of such available firewalls within a SCADA system, the inventors have recognised that SCADA systems are still vulnerable to malicious attacks.

In addition, the inventors have recognised that there is a lack of scalability of such existing firewalls particularly when proprietary industrial protocols are used in a SCADA system that is used in an industrial environment.

Hence, there exists a need for an industrial control system and a method of inspecting one or more communication packets in an industrial control system that seek to address at least one of the above problems.

SUMMARY

In accordance with an aspect of the present disclosure, there is provided an industrial control system, the firewall module comprising a packet accessing component configured to access a communication packet of an industrial control system; a firewall rules database, the firewall rules database configured to store one or more firewall rules; an inspection module configured to access the one or more firewall rules based on an industrial protocol associated with the communication packet; and the inspection module is further configured to perform a comprehensive inspection of all header fields and data fields of the communication packet based on the one or more firewall rules accessed based on the industrial protocol associated with the communication packet.

The firewall module may comprise a sequence check module, the sequence check module coupled to the inspection module; a sequence check database, the sequence check database configured to store one or more legal sequences, each legal sequence comprising a sequential order of at least two known commands; wherein the inspection module may be configured to identify whether the communication packet is a sequence-oriented communication packet based on the comprehensive inspection, the identification being based on the at least two known commands; and wherein if the communication packet is identified as a sequence-oriented communication packet, the sequence check module may be configured to access the one or more legal sequences to determine whether the communication packet is in accordance with at least one legal sequence, the determination being based on one or more sequence states of any preceding communication packet that is in accordance with the at least one legal sequence.

The sequence check database may be configured to store the one or more sequence states of any preceding communication packet that is in accordance with the at least one legal sequence.

The sequence check module may be configured to allow addition of a new legal sequence to the sequence check database.

The firewall module may further comprise the firewall rules database being configured to store one or more pre-defined critical states of the industrial control system; the inspection module may be further configured to determine one or more instructed states of the industrial control system based on the comprehensive inspection; and the inspection module may be configured to monitor a difference between the one or more instructed states and the one or more pre-defined critical states.

The inspection module may be further configured to determine whether there is an abnormal activity of the communication packet based on the comprehensive inspection and based on any preceding communication packet assessed by the firewall module.

The firewall rules database may be configured to sort the one or more firewall rules using an index; the inspection module may be further configured to perform the comprehensive inspection of the all header fields and data fields of the communication packet based on using the index.

The firewall rules database may be configured to store the sorted one or more firewall rules as one or more index trees, each index tree being associated with an industrial protocol.

The firewall module may further comprise a protocol creation module coupled to the firewall rules database, the protocol creation module being configured to allow creation of a new industrial protocol for addition to the firewall rules database.

The firewall module may comprise a preliminary detection module configured to access network layer information and a protocol packet format based on the industrial protocol associated with the communication packet; and the preliminary detection module is further configured to perform an inspection of the communication packet based on the network layer information and the protocol packet format based on the industrial protocol associated with the communication packet.

In accordance with another aspect of the present disclosure, there is provided a method of inspecting one or more communication packets in an industrial control system, the method comprising accessing a communication packet for inspection; storing one or more firewall rules in a firewall rules database; accessing the one or more firewall rules based on an industrial protocol associated with the communication packet; and performing a comprehensive inspection of all header fields and data fields of the communication packet based on the one or more firewall rules accessed based on the industrial protocol associated with the communication packet.

The method may comprise storing one or more legal sequences in a sequence check database, each legal sequence comprising a sequential order of at least two known commands; identifying whether the communication packet is a sequence-oriented communication packet based on the comprehensive inspection, the identification being based on the at least two known commands; and if the communication packet is identified as a sequence-oriented communication packet, accessing the one or more legal sequences to determine whether the communication packet is in accordance with at least one legal sequence, the determination being based on one or more sequence states of any preceding communication packet that is in accordance with the at least one legal sequence.

The method may further comprise storing the one or more sequence states of any preceding communication packet that is in accordance with the at least one legal sequence.

The method may further comprise allowing addition of a new legal sequence to the sequence check database.

The method may further comprise storing one or more pre-defined critical states of the industrial control system in the firewall rules database; determining one or more instructed states of the industrial control system based on the comprehensive inspection; and monitoring a difference between the one or more instructed states and the one or more pre-defined critical states.

The method may further comprise determining whether there is an abnormal activity of the communication packet based on the comprehensive inspection and based on any preceding communication packet assessed by the firewall module.

The method may further comprise sorting the one or more firewall rules using an index; using the index to perform the comprehensive inspection of the all header fields and data fields of the communication packet based on.

The method may further comprise storing the sorted one or more firewall rules as one or more index trees in the firewall rules database, each index tree being associated with an industrial protocol.

The method may further comprise allowing creation of a new industrial protocol for addition to the firewall rules database.

The method may further comprise accessing network layer information and a protocol packet format based on the industrial protocol associated with the communication packet; and performing an inspection of the communication packet based on the network layer information and the protocol packet format based on the industrial protocol associated with the communication packet.

BRIEF DESCRIPTION OF THE DRAWINGS

Exemplary embodiments in the present disclosure will be better understood and readily apparent to one of ordinary skill in the art from the following written description, by way of example only, and in conjunction with the drawings, in which:

FIG. 7 is a table illustrating indexes in a payload of Modbus Functions 8 and 15 in an exemplary embodiment.

DETAILED DESCRIPTION

Exemplary embodiments described herein may provide an industrial control system and a method of inspecting one or more communication packets in an industrial control system. The firewall module may conduct a comprehensive packet inspection of a packet/command/message of an industrial control system, the inspection being an inspection of the header fields and data fields of the packet. With the comprehensive packet inspection, the firewall module may understand the application content details of the packet. The firewall module may thereafter usefully perform other functions with such an understanding. As an example, the firewall module may identify a packet based on comparison of its contents with a known command and may determine whether the packet is part of a legal sequence of commands. The firewall module may also determine whether the packet is in accordance with the legal sequence based on a sequence state or status of the legal sequence. As another example, with the understanding of the application content details, the firewall module may determine whether a device of the system is approaching a critical state. The firewall module may also determine whether the packet is instructing any anomaly/abnormal activity.

In the description herein, the firewall module may also provide other useful functions such as providing scalability by allowing creation of industrial protocol and/or customised firewall rules; providing a way of sorting firewall rules to reduce network latency etc.

Figure 1A:
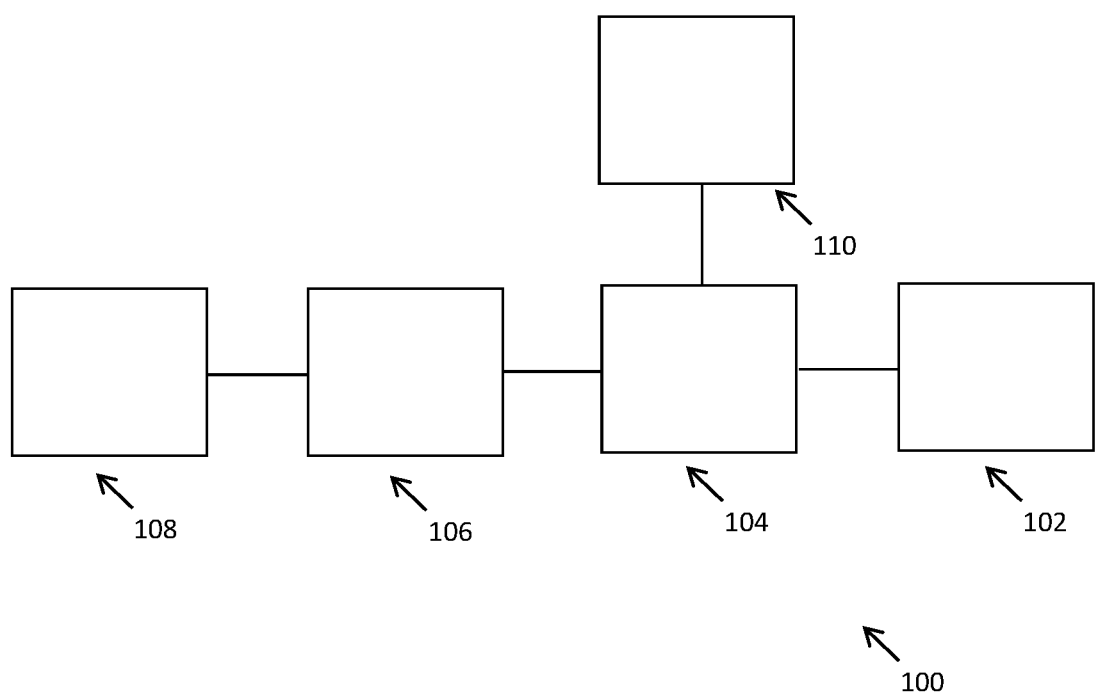
FIG. 1A is a schematic diagram of an industrial control system in an exemplary embodiment.

FIG. 1A is a schematic diagram of an industrial control system in an exemplary embodiment. The industrial control system 100 may be a Supervisory Control and Data Acquisition (SCADA) system.

In the exemplary embodiment, the system 100 comprises a control centre 102 that is coupled to a communication network 104. In the exemplary embodiment, the communication network 104 is coupled to one or more one or more field data interface devices 106 that are in turn coupled to one or more field devices 108. In the exemplary embodiment, the system 100 comprises a firewall module 110 coupled to the communication network 104.

In the exemplary embodiment, the communication network 104 is configured to facilitate communications (e.g. transmission and/or receipt of data) between the control centre 102 and the one or more field data interface devices 106. The communications may be in the form of wired communications (e.g. Ethernet, serial lines), wireless communications or both.

In the exemplary embodiment, the control centre 102 is in the form of, but is not limited to, a computer server, and comprises a processing module and a database (both not shown). The processing module may be configured to control the various components of the system 100 (e.g. states of the one or more field devices 108), and the database may store thereon data e.g. codes for a standard or customised operator interface software.

In some exemplary embodiments, the control centre 102 may be further coupled to or comprises a user interface module (not shown) that is configured to allow a user to use a graphic user interface (GUI). The GUI may be made available to the user on the user interface module via execution of a stored operator interface software by the processing module of the control centre 102. In such exemplary embodiments, the user, via interactions with the GUI may e.g. enter new data and/or edit data stored in the database of the control centre 102. Such data may configure or affect the workings of the firewall module 110.

In the exemplary embodiment, the one or more field data interface devices 106 may each be configured to convert data received from the one or more field devices 108 into a form suitable for transmission over the communication network 104 e.g. to the control centre 102. The one or more field data interface devices 106 may also transmit data from the control centre 102 to the one or more field devices 108. In the exemplary embodiment, the one or more field data interface devices 106 may be a Remote Terminal Unit (RTU) or a Programmable Logic Controller (PLC).

In the exemplary embodiment, the one or more field devices 108 may be sensors and/or controls, and may each comprise one or more sensors, motors and/or actuators (not shown). The one or more field devices 108 may each further comprise a processing module (not shown).

In the exemplary embodiment, the one or more field devices 108 may be configured to monitor and/or detect one or more states (e.g. physical states) of an area/component of the system 100. The one or more field devices 108 may be further configured to, in response to detecting a change in the one or more states, activate a response via e.g. activation of one or more motors and/or actuators.

Some examples of the one or more field devices 108 may include, but are not limited to, a fire/smoke alarm, an escalator/lift, a station/tunnel lighting switch, a platform door, a power breaker, a temperature sensor and a sewage ejector.

In the exemplary embodiment, in use, the one or more field devices 108 are monitored and controlled by the one or more field data interface devices 106. For example, when a change in one or more states are detected by the one or more field devices 108, the processing module of the one or more field devices 108 may be configured to transmit data (regarding the change in one or more states) from the one or more field devices 108 to the one or more field data interface devices 106. The processing module of the one or more field data interface devices 106, upon receiving such data from the one or more field devices 108, may then subsequently convert the data received from the one or more field devices 108 into a form suitable for transmission over the communication network 104. The data may be transmitted to the control centre 102 where the processing module of the control centre 102 processes the data and causes information (relating to the detected change in the one or more states) to be communicated to the user (e.g. via activating a pop-up on the GUI on the user interface module or to activate an alarm sounded through an audio member coupled to the control centre 102) to inform the user of the detected change. The user may use the information received to respond to the detected change.

In the exemplary embodiment, the firewall module 110 comprises an inspection module (not shown) that is configured to inspect data being transmitted via the communication network 104 to and from the control centre 102 and the one or more field data interface devices 106. The firewall module 110 may further comprise a database or library for storing e.g. one or more firewall rules and/or one or more legal sequences of a series of commands.

In the exemplary embodiment, the system 100 (comprising the firewall module 110) may be utilised as a centralised system to monitor and/or control a manufacturing and/or an industrial plant with enhanced security to minimise the vulnerability of the system 100 to malicious attacks.

The system of the described exemplary embodiment covers the main components of an industrial control system or a SCADA system, i.e. a control centre, a communication network, one or more field data interface devices, one or more field devices and a proposed firewall module. It will be appreciated that the exemplary embodiment is not limited as such.

In some exemplary embodiments, a system/network may comprise a collection of servers, operator interfaces, controllers and field devices connected/coupled together by a communication network. In various exemplary embodiments, the scale and complexity of a system/network may vary depending on the number of processes that the system/network controls as well as the scale of utility which runs the system/network.

In various exemplary embodiments, a SCADA system/network may comprise a SCADA control centre (or termed as SCADA master), one or more field data interface devices (such as RTUs or PLCs), a communication network configured to connect the control centre with field data interface devices (e.g. via Ethernet or serial lines), a standard or customised operator interface software installed in the control centre (e.g. comprising GUIs), and a plurality of field devices (e.g. sensors, motors, actuators) monitored and controlled by the RTUs and/or PLCs.

Figure 1B:
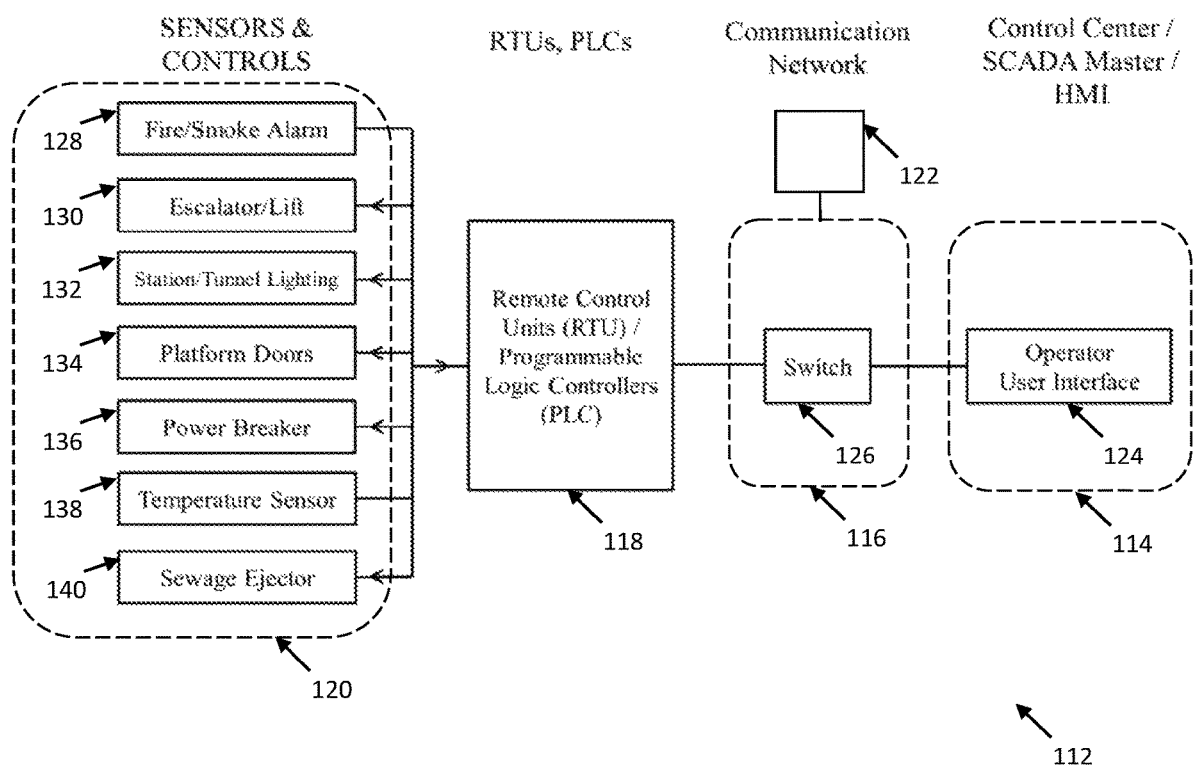
FIG. 1B is a schematic diagram of a Supervisory Control and Data Acquisition (SCADA) system in an exemplary embodiment.

FIG. 1B is a schematic diagram of a SCADA system in an exemplary embodiment. In this exemplary embodiment, the SCADA system 112 functions substantially similarly to the industrial control system 100 described with reference to FIG. 1A.

In the exemplary embodiment, the SCADA system 112 comprises a control centre 114 (or referred to as a SCADA Master) that is coupled to a communication network 116. In the exemplary embodiment, the communication network 116 is also coupled to one or more one or more RTUs and/or PLCs 118 (compare e.g. one or more field data interface devices 106 of FIG. 1A) that are in turn coupled to one or more field devices 120 (e.g. sensors and/or controls; compare e.g. one or more field devices 108 of FIG. 1A). In the exemplary embodiment, the communication network 116 is further coupled to a firewall module 122 (compare e.g. firewall module 110 of FIG. 1A).

In the exemplary embodiment, the control centre 114 comprises an operator user interface module 124 that is configured to e.g. display information on a Human-Machine Interface (HMI).

In the exemplary embodiment, the communication network 116 comprises a switch device 126 that is configured to facilitate communications (e.g. transmission and/or receipt of data) between the control centre 114 and the one or more RTUs and/or PLCs 118.

In the exemplary embodiment, the one or more field devices 120, such as e.g. a fire/smoke alarm 128, an escalator/lift 130, a station/tunnel lighting switch 132, platform doors 134, a power breaker 136, a temperature sensor 138 and a sewage ejector 140, are controllable by the one or more RTUs and/or PLCs 118. A person skilled in the art will appreciate that the exemplary embodiment is not limited to the aforementioned sensors and/or controls, and that there may be provided one or more of the same or other types of sensors and/or controls.

In the exemplary embodiment, the SCADA system 112 is e.g. a Metro SCADA equipment/system (i.e. relating to train operations). The one or more RTUs and/or PLCs 118 are configured to perform on-site monitoring and control. For example, in the Metro SCADA system, the one or more RTUs and/or PLCs 118 acquire the real-time states from the one or more field devices 120, such as the fire alarm sensor 128, and transfer the data to the SCADA control centre 114. The data received by the SCADA control centre 114 may then be displayed via the HMI. Concurrently, the one or more RTUs and/or PLCs 118 are configured to also perform local control after receiving operation commands, such as for tunnel lighting status, power breaker control, and station platform doors, from the SCADA control centre 114.

In the exemplary embodiment, the one or more RTUs 118 may be capable of supporting more communication protocols and have better data processing capability as compared to the one or more PLCs 118. The one or more RTUs 118 may be suitable for e.g. remote monitoring and control. The one or more PLCs 118, on the other hand, may be configured to have relatively more sophisticated embedded control capability as compared to the one or more RTUs 118. Hence, in the exemplary embodiment, one RTU 118 may be configured to be connected/coupled to multiple PLCs 118 to which the one or more field devices 120 are connected/coupled. In such an arrangement, the RTU 118 may play the role of a gateway that is responsible for facilitating communication between the SCADA control centre 114 and the one or more field devices 120. That is, e.g. monitored data and control commands may be arranged to pass through the RTU 118.

In the SCADA system 112 of the exemplary embodiment, data may be transmitted through multiple communication interfaces or medium such as e.g. Ethernet, serial lines, fiber, and microwave. Ethernet may be utilised as an interface that connects different sub-systems to form a Local Area Network (LAN) with standard or proprietary industrial protocols. Existing SCADA protocols may include e.g. Modbus, DNP3 (Distributed Network Protocol), EtherNet/IP etc. These protocols were typically SCADA-vendor specific but have become widely adopted and used by many SCADA vendors. There are also extensions to support the transmission over another medium e.g. TCP/IP. For example, Modbus/RTU is typically designed for serial communication, and Modbus/TCP, which is an extension of Modbus/RTU, may be designed for Ethernet communication.

In the exemplary embodiment, the firewall module 122 comprises an inspection module (not shown) that is configured to inspect all application fields in data (e.g. Modbus data), e.g. all header fields and all data fields of each packet/command/message, being transmitted over the communication network 116. Such a form of inspection by the inspection module is termed comprehensive packet inspection (CPI) in this description. Typical Modbus data structures are exemplarily described in FIG. 2 below.

Figure 2:
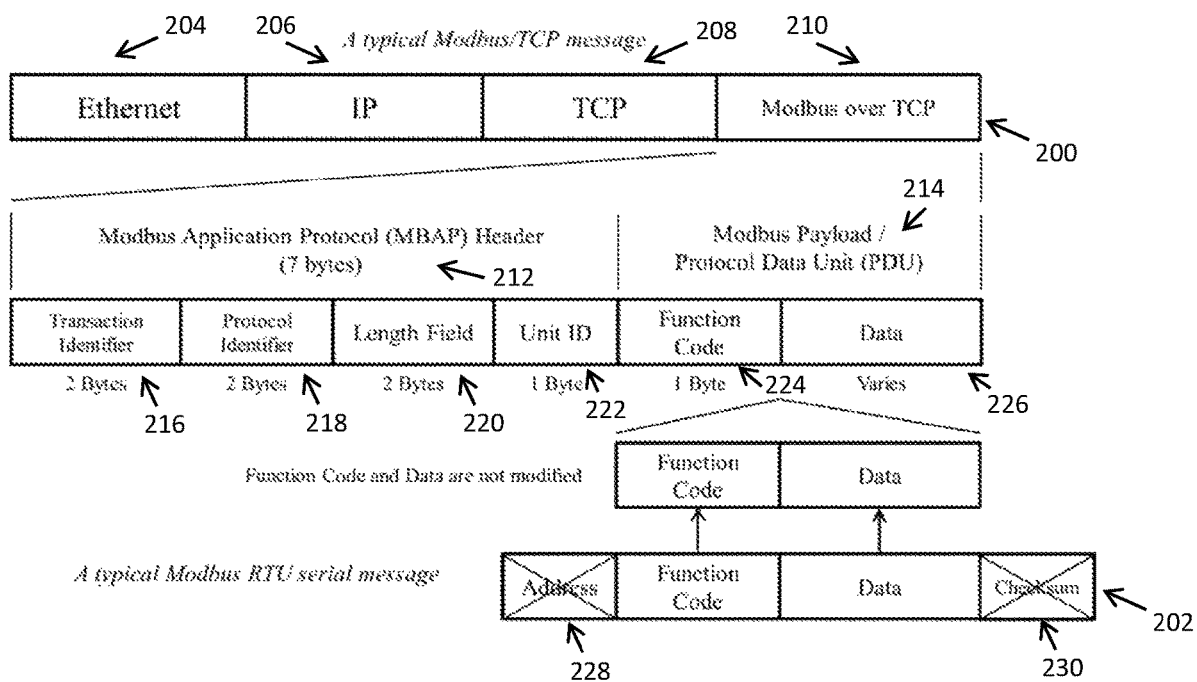
FIG. 2 is a schematic diagram illustrating Modbus data structures in an exemplary embodiment.

FIG. 2 is a schematic diagram illustrating Modbus data structures in an exemplary embodiment.

In the exemplary embodiment, a typical Modbus/TCP message 200 and a typical Modbus RTU serial message 202 are illustrated. FIG. 2 also schematically shows format conversion between the Modbus/TCP message 200 and the Modbus RTU serial message 202.

In the exemplary embodiment, the Modbus/TCP message 200 may comprise an Ethernet address header 204, an IP data portion 206, a TCP data portion 208 and a Modbus-over-TCP data portion 210. The Modbus-over-TCP data portion 210 comprises a Modbus Application Protocol (MBAP) Header 212 (of 7 bytes) and a Modbus Payload/Protocol Data Unit (PDU) portion 214. The MBAP Header 212 comprises a Transaction Identifier 216 (of 2 bytes), a Protocol Identifier 218 (of 2 bytes), a length field 220 (of 2 bytes) and a unit ID 222 (of 1 byte). The Modbus Payload/PDU portion 214 comprises a function code 224 (of 1 byte) and data 226 (of varying number of bytes). The data 226 may be, for example, to instruct actions of one or more field devices. The contents of the Modbus Payload/PDU portion 214 may be acquired (without modification) from the Modbus RTU serial message 202 which further comprises an address portion 228 and a checksum 230, both of which may be discarded in conversion to the Modbus/TCP message 200.

In the description herein, in relation to the Modbus/TCP message 200, e.g. the unit ID 222, function code 224 and data 226 may be referred to as examples of application fields. Further, the unit ID 222 and function code 224 may be referred to as examples of header fields, and the data 226 may be referred to as an example of a data field.

In the exemplary embodiment, in use, conversion between a Modbus/RTU packet (e.g. Modbus RTU serial message 202) and a Modbus/TCP packet (e.g. the Modbus/TCP message 200) is therefore possible.

The inventors have recognised that a conventional SCADA firewall is unable to provide comprehensive inspection on the application fields (e.g. in data 226) of industrial protocols, and also do not support e.g. Deep Packet Inspection (DPI) for proprietary industrial protocols. To enhance communication security in a SCADA system, the inventors have recognised that an advanced DPI module with more security features may be proposed for a firewall or firewall module. In various exemplary embodiments, the currently-proposed advanced DPI module and the firewall may be termed as SCADA Firewall++ or a firewall module (compare e.g. firewall module 110 of FIG. 1A and firewall module 122 of FIG. 1B).

The inventors have recognised that the following technical challenges may be encountered during the design process of the proposed firewall module.

Firstly, the inventors have recognised that an understanding of the working theory of existing DPI techniques on standard industrial protocols may be needed. Different industrial protocols may follow different payload structures/frames to transmit information in a SCADA system. In such payloads, the function of each bit/byte is officially standardised by related industrial organisations. Hence, in various exemplary embodiments, it may be desirable for a firewall module to be configured to keep/store this knowledge in a library, and be capable of executing the correct protocol during user configuration and DPI filtering.

Next, the inventors have recognised that it may be desirable for the firewall module to inspect all application fields in a payload (e.g. unit ID 222, function code 224 and data 226 of the Modbus/TCP message 200) that may potentially be exploited by attackers regardless of the standard or proprietary industrial protocols. In a packet payload, it may be possible for both header fields (e.g. unit ID 222 and function code 224) and data fields (e.g. data 226) to be exploited by an attacker to launch attacks. Thus, in various exemplary embodiments, it may be desirable for the firewall module to be configured to inspect all these fields (i.e. both header fields and data fields) based on e.g. a systematic algorithm. In various exemplary embodiments, the structure/frame of proprietary industrial protocols may be added into the firewall module library by users (e.g. via control centre 102 of FIG. 1A, control centre 114 of FIG. 1B) in order to conduct inspection.

The inventors have further recognised that additional latency may be generated due to the increase in inspected data bytes i.e. inspection of all application fields. If a firewall module digs deeper and inspects more data bytes in each single packet, a skilled person will appreciate that in theory, additional latency may be generated. In existing SCADA firewalls, an incoming packet is checked against each firewall rule until a first-matching is found. The inventors have recognised that this rules-matching approach may not suitable/desirable for the proposed firewall module in an exemplary embodiment. Hence, in various exemplary embodiments, an optimised rules-matching function may also be considered to reduce potential latency.

In light of the foregoing, in various exemplary embodiments, it may be desirable that in the application fields (e.g. unit ID 222, function code 224 and data 226), not only the header fields (e.g. unit ID 222 and function code 224) but also the data fields (e.g. data 226) are inspected entirely by the firewall module. Existing SCADA firewalls may dig/inspect the payload until the end of header fields (e.g. unit ID 222 and function code 224) to understand/detect what standard industrial protocol is employed and what kind of service is being called. In various exemplary embodiments of the present disclosure, the capabilities of existing SCADA firewalls may be kept but the inventors have recognised that these capabilities may not be sufficient to ensure communication security. Thus, in various exemplary embodiments, the firewall module is configured to dig/inspect beyond the header fields (e.g. unit ID 222 and function code 224) to inspect the data fields (e.g. data 226), which may include more valuable information such as e.g. sub-function options, register values and other customised services. Such a form of inspection is termed as comprehensive packet inspection.

In various exemplary embodiments, when using Modbus protocol as an example, the firewall module may be configured to inspect (e.g. via an inspection module) fields residing in the header fields as well as data fields of a Modbus packet/message, such as function code 224, unit ID 222 and an address filter as well as sub function code options, register values and other advanced customised services if available.

Figure 3A:
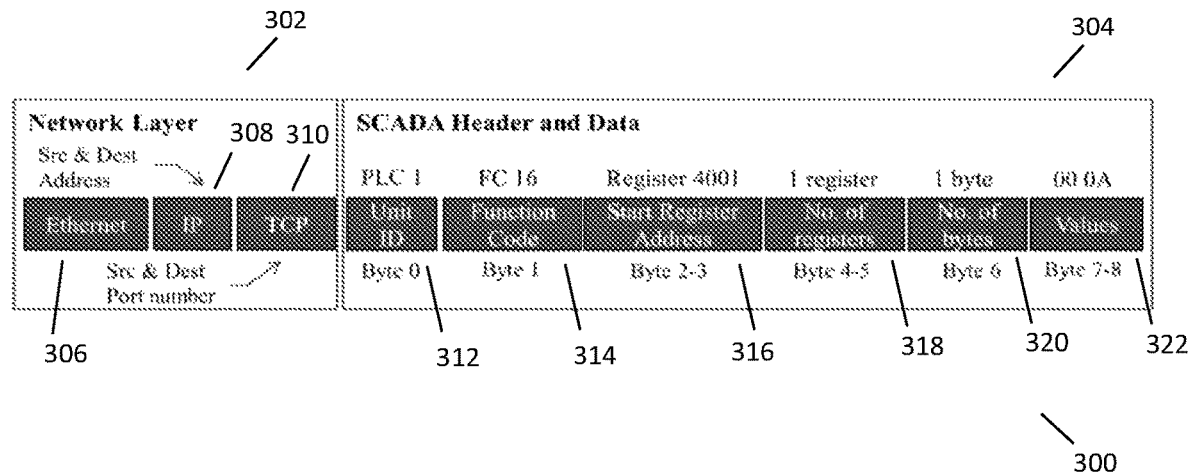
FIG. 3A is a schematic diagram illustrating a Modbus command in an exemplary embodiment.

FIG. 3A is a schematic diagram illustrating a Modbus command in an exemplary embodiment. The command may be referred to as a message or as a data packet or as a data packet containing a command payload.

In the exemplary embodiment, the Modbus command 300 comprises a network layer 302 and a SCADA header and data segment 304. The network layer 302 comprises an Ethernet header 306, an IP data portion 308, and a TCP data portion 310. The IP data portion 308 comprises data on source (src) and destination (dst) addresses. The TCP data portion 310 comprises data on source (src) and destination (dst) port numbers. The SCADA header and data segment 304 comprises a unit ID field 312 (contains e.g. values indicating that the Modbus command 300 is being sent from/to a PLC referred to as "PLC 1") at byte 0, a function code field 314 (contains e.g. values indicating "FC 16") at byte 1, a start register address field 316 (contains e.g. values indicating "Register 4001") at bytes 2 to 3, a field for number of registers 318 (contains e.g. values indicating "1 register") at bytes 4 to 5, a field for number of bytes 320 (contains e.g. values indicating "1 byte") at byte 6 and a values field 322 (contains e.g. values "00 0A") at bytes 7 to 8.

In the exemplary embodiment, as described above, each bit/byte may have its own objective or purpose, e.g. identifying a register, writing a value into the register etc.

Figure 3B:
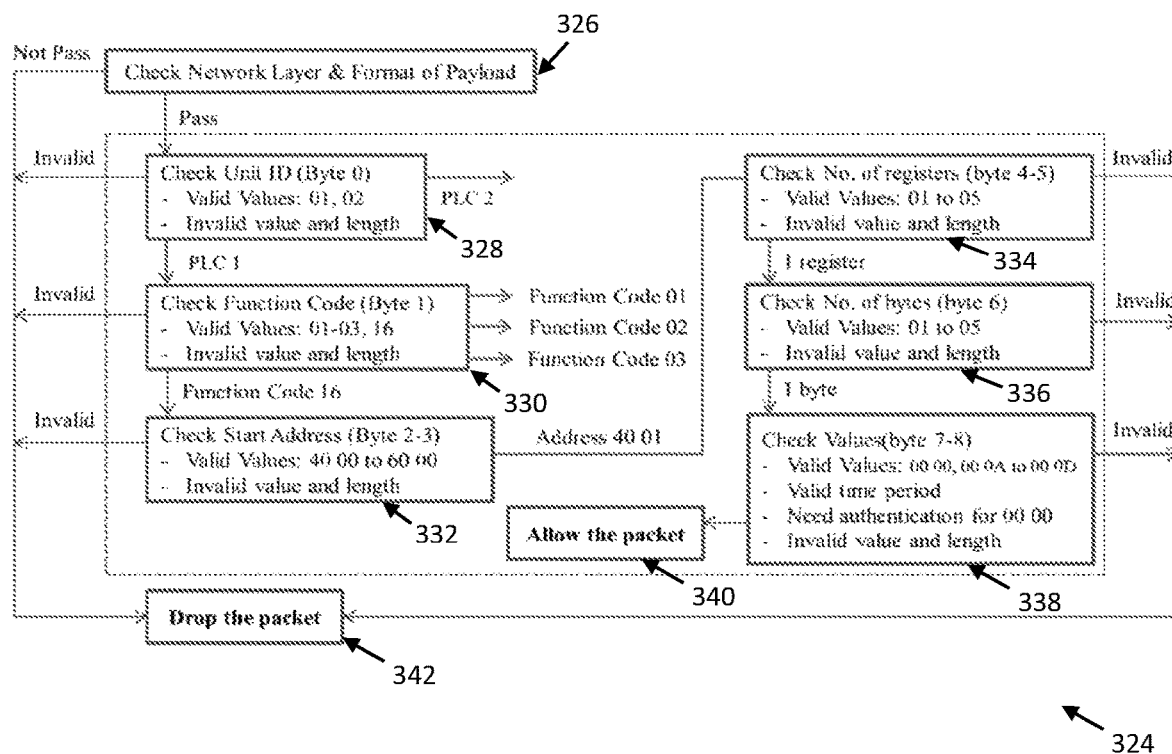
FIG. 3B is a schematic flowchart illustrating a method of inspecting a payload in an exemplary embodiment.

FIG. 3B is a schematic flowchart illustrating a method of inspecting a payload in an exemplary embodiment. The method is implemented by a firewall module comprising an inspection module.

In the exemplary embodiment, the method is for inspecting data in the Modbus payload/command 300 of FIG. 3A. Like numerals are used. It is to be appreciated that the steps of the method may be modified depending on applications e.g. the payload being inspected and/or the industrial protocols being used.

In various exemplary embodiments, each step in the method may be executed by the firewall module (compare e.g. firewall module 110 of FIG. 1A and firewall module 122 of FIG. 1B).

In the exemplary embodiment, at step 326, a check is performed on the network layer (e.g. network layer 302) and format of the Modbus payload/command 300 against one or more pre-configured firewall rules. The one or more pre-configured firewall rules may be stored in and be obtained/loaded/searched from e.g. a library or firewall rules database of the firewall module. In the exemplary embodiment, the check at step 326 may additionally comprise checking the length of the Modbus payload/command 300. In various exemplary embodiments, this step (step 326) may be desirable in that malicious or abnormal data may be rejected at an early stage if it is determined that the inspected Modbus payload/command 300 does not pass the check at step 326, e.g. if the length and/or format of the command is incorrect as compared to a known Modbus length and/or format. If it is determined that the Modbus payload/command 300 passes the check at step 326, the method proceeds to step 328.

A check on all application fields is then conducted by the inspection module. At step 328, a check is performed on the value at byte 0 (unit ID field 312) against one or more firewall rules. In the exemplary embodiment, byte 0 (unit ID field 312) of the Modbus payload/command 300 contains values indicating the PLC which the Modbus payload/command 300 is being sent from/to. In the exemplary embodiment, valid values may be "01" (e.g. the Modbus payload/command 300 is being sent from/to a PLC referred to as "PLC 1") and "02" (e.g. the Modbus payload/command 300 is being sent from/to a PLC referred to as "PLC 2"). In the exemplary embodiment, at step 328, the check performed includes determining whether the values are valid or invalid, and checking the length of the values. In the exemplary embodiment, if it is determined that the value at byte 0 is "01" (one of the valid values), firewall rules relating to PLC 1 are loaded/searched (e.g. onto the inspection module) and the method proceeds to step 330.

At step 330, a check is performed on the value at byte 1 (function code field 314) against the one or more firewall rules loaded/searched relating to PLC 1. In the exemplary embodiment, byte 1 (function code field 314) of the Modbus payload/command 300 contains values indicating a function code. In the exemplary embodiment, valid values may be 01 to 03 and 16. In the exemplary embodiment, at step 330, the check performed includes determining whether the values are valid or invalid, and checking the length of the values. In the exemplary embodiment, if it is determined that the value at byte 1 is "16" (one of the valid values), firewall rules relating to function code 16 are loaded/searched and the method proceeds to step 332.

At step 332, a check is performed on the value at bytes 2 to 3 (start register address field 316) against the one or more firewall rules loaded/searched relating to function code 16. In the exemplary embodiment, bytes 2 to 3 (start register address field 316) of the Modbus payload/command 300 contain values indicating a start register address. In the exemplary embodiment, valid values may be 40 00 to 60 00. In the exemplary embodiment, at step 332, the check performed includes determining whether the values are valid or invalid, and checking the length of the values. In the exemplary embodiment, if it is determined that the value at bytes 2 to 3 is "40 01" (one of the valid values), firewall rules relating to address 40 01 are loaded/searched and the method proceeds to step 334.

At step 334, a check is performed on the value at bytes 4 to 5 (a field for number of registers 318) against the one or more firewall rules loaded/searched relating to address 40 01. In the exemplary embodiment, bytes 4 to 5 (a field for number of registers 318) of the Modbus payload/command 300 contain values indicating the number of registers. In the exemplary embodiment, valid values may be 01 to 05. In the exemplary embodiment, at step 334, the check performed includes determining whether the values are valid or invalid, and checking the length of the values. In the exemplary embodiment, if it is determined that the value at bytes 4 to 5 is "01" (one of the valid values), firewall rules relating to 1 register are loaded/searched and the method proceeds to step 336.

At step 336, a check is performed on the value at byte 6 (a field for number of bytes 320) against the one or more firewall rules loaded/searched relating to 1 register. In the exemplary embodiment, byte 6 (a field for number of bytes 320) of the Modbus payload/command 300 contains values indicating the number of bytes. In the exemplary embodiment, valid values may be 01 to 05. In the exemplary embodiment, at step 336, the check performed includes determining whether the values are valid or invalid, and checking the length of the values. In the exemplary embodiment, if it is determined that the value at byte 6 is "01" (one of the valid values), firewall rules relating to 1 byte are loaded/searched and the method proceeds to step 338.

At step 338, a check is performed on the value at bytes 7 to 8 (a values field 322) against the one or more firewall rules loaded/searched relating to 1 byte. In the exemplary embodiment, bytes 7 to 8 (a values field 322) of the Modbus payload/command 300 contains machine-readable values. In the exemplary embodiment, valid values may be 00 00, 00 0A to 00 0D. In the exemplary embodiment, at step 338, the check performed includes determining whether the value is being received within a valid time period, determining whether the value at bytes 7 to 8 is "00 00" (in which, authentication may be required), determining whether the values are valid or invalid, and checking the length of the values. In the exemplary embodiment, if it is determined that the value at bytes 7 to 8 is "00 0A" (one of the valid values), the method proceeds to step 340.

In the exemplary embodiment, at step 340, the Modbus payload/command 300 (or packet) is allowed e.g. for transmission.

In the exemplary embodiment, at step 326, if it is determined that the Modbus payload/command 300 did not pass the check performed at step 326, the method proceeds to step 342 and the packet/message (comprising Modbus payload/command 300) is dropped/rejected. Further, in the exemplary embodiment, at steps 328, 330, 332, 334, 336 and 338, if it is determined that the inspected value is invalid, the method proceeds to step 342 and the packet (comprising Modbus payload/command 300) is dropped/rejected.

In the exemplary embodiment, at step 328, if it is determined that the value is "02", firewall rules relating to PLC 2 may be loaded/searched and the method may proceed to a modified form of step 330 (not shown) in which the step is carried out based on performing the check against one or more firewall rules loaded/searched relating to PLC 2 (instead of one or more firewall rules relating to PLC 1 as used in step 330).

In the exemplary embodiment, at step 330, if it is determined that the value is "01", "02" or "03", firewall rules pertaining to function code 01, function code 02 and function code 03 may be loaded/searched respectively and the method may proceed to a modified form of step 332 (not shown) in which the step is carried out based on performing the check against one or more firewall rules loaded/searched relating to function code 01, function code 02 and function code 03 respectively (instead of one or more firewall rules relating to function code 16 as used in step 332).

In the exemplary embodiment, the inspection module of the firewall module (compare e.g. inspection module of FIGS. 1A and 1B) may be activated before the method proceeds to step 328 so that the inspection module may perform the checks performed at step 328, 330, 332, 334, 336 and 338. In the exemplary embodiment, the entirety of the Modbus command 300 is inspected including the data fields (i.e. byte 4 to 8 in Modbus payload/command 300).

In the exemplary embodiment, one or more customised option/criteria/sub-steps may be added in the method. For example, a customised criteria/sub-step may be that a firewall rule may only be activated within a pre-determined time period. When implemented, when one or more firewall rules are searched/looked up in the method, a check may be performed to determine that the firewall rules are being activated during the pre-determined time period. If it is determined that the firewall rules are being activated during the pre-determined time period, the method may proceed. However, if it is determined that the firewall rules are being activated outside the pre-determined time period, the packet (e.g. Modbus payload/command 300) may be dropped (such as in step 342 of the method). For example, such a customised criteria may filter unauthorised access outside of authorised working hours.

In the exemplary embodiment, in order to configure one or more firewall rules to restrict the packets carrying bad or invalid values in the payload, a user may desirably have a good knowledge on the payload frame of industrial protocols.

Figure 4:
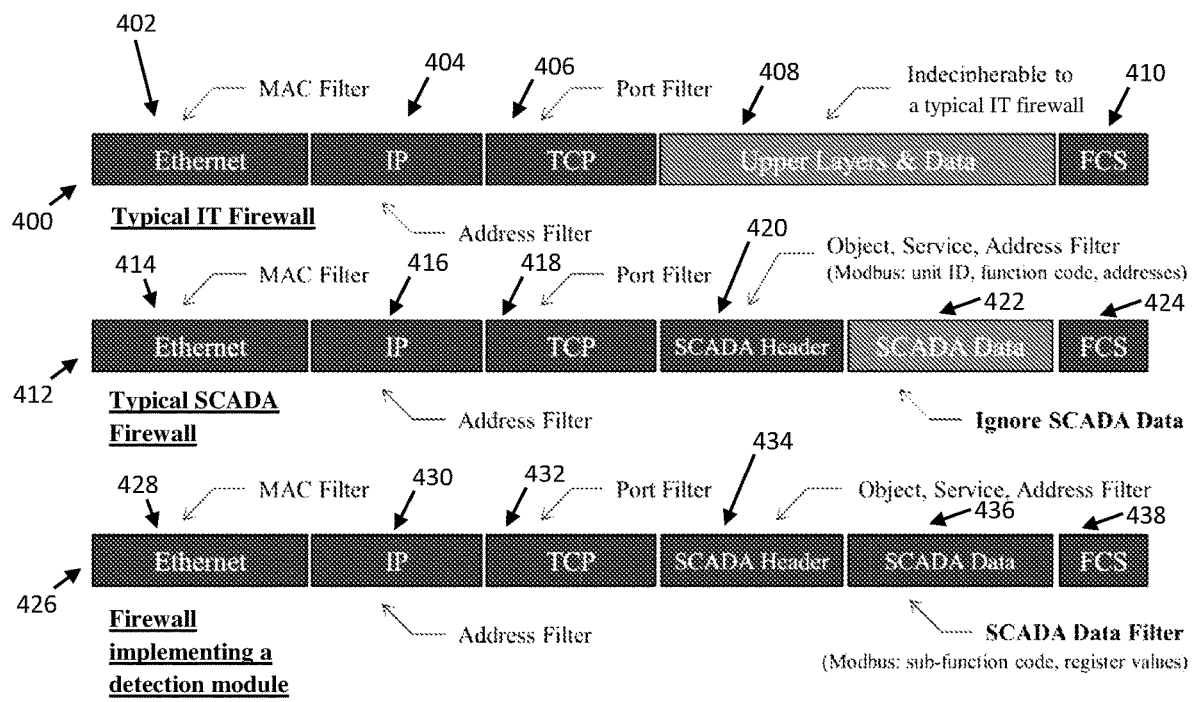
FIG. 4 is a schematic diagram illustrating comparative differences in filtering capabilities between a typical information technology (IT) firewall, a conventional SCADA firewall and a firewall module of an exemplary embodiment.

FIG. 4 is a schematic diagram illustrating comparative differences in filtering capabilities between a typical information technology (IT) firewall, a conventional SCADA firewall and a firewall module of an exemplary embodiment.

The firewall module (compare e.g. firewall module 110 of FIG. 1A and firewall module 122 of FIG. 1B) may comprise an inspection module to perform comprehensive packet inspection. The inventors recognised that comprehensive packet inspection may be significant due to a recognition that it may not be difficult for an experienced attacker to launch cyber-attacks by sending forged SCADA commands, which may follow a legitimate format but contain altered data values. This is elaborated further below.

A payload 400 may comprise an Ethernet header 402, an IP data portion 404, a TCP data portion 406, upper layers and data 408, and a Frame Check Sequence (FCS) 410. In the exemplary embodiment, when the payload 400 passes through a typical IT firewall, the Ethernet header 402 may be utilised by a MAC filter, the IP data portion 404 may be utilised by an address filter, the TCP data portion 406 may be utilised by a port filter and the FCS 410 may comprise a checksum for ensuring that the frame of the payload has not been corrupted. However, the upper layers and data 408 are typically indecipherable to the typical IT firewall (and are thus not inspected).

For a conventional SCADA firewall, a payload 412 may comprise an Ethernet header 414, an IP data portion 416, a TCP data portion 418, a SCADA Header 420, a SCADA data portion 422 and a FCS 424. The Ethernet header 414, IP data portion 416, TCP data portion 418 and the FCS 424 may function substantially similarly to those of payload 400. When the payload 412 passes through a conventional SCADA firewall, the SCADA firewall may be capable of inspecting the contents of the SCADA header 420 such as using an object, service and address filter. For example, if the payload 412 is a Modbus payload, the contents of the SCADA header may include e.g. unit ID, function code and addresses. However, when the payload 412 passes through a conventional SCADA firewall, SCADA data 422 is ignored (not inspected).

As is appreciated, both the IT firewalls and conventional SCADA firewalls are not capable of inspecting data values in a payload.

In one exemplary embodiment, a firewall module is capable of inspecting data values in a payload 426 in a SCADA system. In the exemplary embodiment, the payload 426 may comprise substantially the same contents as the contents of the payload 412 (i.e. payload 426 comprises an Ethernet header 428, an IP data portion 430, a TCP data portion 432, a SCADA header 434, SCADA data 436 and FCS 438). When the payload 426 passes through the firewall module, an inspection module of the firewall module is capable of inspecting the SCADA data 436, unlike e.g. when passing through a typical SCADA firewall. In exemplary embodiments, if the payload 426 is a Modbus payload, the contents of the SCADA data 436 that may be inspected may include e.g. a sub-function code and register values. The comprehensive packet inspection may be performed utilising index-matched rules associated with the industrial protocol of the payload 426 and the rules are associated with the functions/workings of each device communicating in the SCADA system/network.

The inventors have recognised that the exemplary/proposed firewall module may present one way to address the issue of an attacker sniffing traffic between a control centre (compare e.g. control centre 102 of FIG. 1A and control centre 114 of FIG. 1B) and one or more RTUs and/or PLCs (compare e.g. one or more field data interface devices 106 and one or more RTUs and/or PLCs 118 of FIG. 1B). The captured traffic may be stored and analysed by the attacker in order to determine the information in the payload, such as data values written to certain PLC registers. The attacker may then spoof or impersonate as a legal operator and send bad/malicious commands to overwrite the register values, and hence affect or even control a SCADA network. The inventors have recognised that a conventional SCADA firewall with DPI (as illustrated above) cannot be configured to detect such attacks because it does not have a SCADA data field inspector. In contrast, the proposed firewall module comprising the inspection module that is capable of inspecting all application fields, including the header and data fields, can alleviate the above problem.

The firewall module of the above exemplary embodiments (comprising the inspection module) may, in other various exemplary embodiments, be further utilised to develop more security features. For example, the inspection module may be utilised to detect and defend against more advanced threats in a SCADA system with additional security functions. The threats may include e.g. out-of-sequence commands, critical state(s), and anomaly/abnormal activities.

A SCADA system may need to interact with a large number of industrial devices and control different operations simultaneously. Many operations may not be accomplished in a single step as they may include a series of consecutive and dependent SCADA commands, which are typically executed orderly in a specific sequence to ensure effectiveness and safety. Commands executed in any illegal sequence may lead to the failure of the system and may even endanger the safety of related people. The inventors recognise that attackers may exploit this drawback in a SCADA system by sniffing certain operations in the SCADA system and forging a series of bad/malicious commands that do not obey a correct/legal/allowable sequence in order to achieve his/her purpose of attacking the SCADA system. In various exemplary embodiments, this may be referred to as an "out-of-sequence commands attack". Commands may also be sent in a wrong sequence due to an operator's error.

The inventors have recognised that existing SCADA systems may lack good security mechanisms to defend against such attacks and to address the drawback. The inventors have also recognised that a typical SCADA firewall may not be capable of achieving out-of-sequence commands detection and prevention because of at least two reasons, namely, that a typical DPI does not inspect all information in a payload (hence, there is typically no full understanding of the detailed service) and that a typical DPI is implemented based on single packet inspection only. A typical DPI does not consider the relationship between multiple SCADA commands/messages.

In an exemplary embodiment, an inspection module may be utilised to fully understand the detailed industrial applications and services. This is an effect from the comprehensive packet inspection that inspects all header and data fields.

A further step that may be taken for additional security functions is to consider the relationship between real-time incoming commands and stored historical/known commands.

For an industrial operation, the legal or allowable sequence of a series of consecutive commands may be stored in the firewall module. In various exemplary embodiments, the firewall module may comprise a sequence database for storing e.g. one or more lists of legal sequences of consecutive commands. For example, a series of Modbus commands may be stored according to their unique values of tags such as source and destination, function codes, sub-function codes if available, editable addresses, and register values.

In various exemplary embodiments, if a SCADA command is to follow a certain sequence condition, such a command may be identified through observing its values of tags and storing this information in a list. Subsequently, if a new real-time incoming command is determined to already exist in a stored list (i.e. matched to a known command of a sequence), the communication/messaging sequence correctness associated with the real-time command may be checked based on a stored legal sequence.

In the exemplary embodiment, the firewall module may comprise a sequence check module. The sequence check module is coupled to the inspection module. The sequence check module is capable of implementing a sequence check function (or referred to as an Out-of-sequence Detection Algorithm (OSDA)) which is designed or configured to detect out-of-sequence commands in a SCADA or industrial control system. In the exemplary embodiment, the firewall module may be capable of functioning differently from e.g. a typical stateful firewall. A typical stateful firewall keeps track of the states of interactions, such as new/existing connections, typically by setting values in a storage field designated for that purpose. This statefulness is typically implemented through the use of two separate search mechanisms, namely, a slow function/algorithm that is designed to implement the first match semantics and compare a packet to the conventional firewall rules, and a fast state lookup mechanism that checks whether a packet belongs to an existing open flow. Instead of tracking connection-level states, in the exemplary embodiment, the sequence check module is configured to track limited active commands, which sit lower than on the connection-level. Those commands may belong to a same connection as long as the connection maintains exchanging of messages. In the exemplary embodiment, the sequence check module may ensure that the legal and consecutive commands are sent in a correct user-defined sequence.

In the exemplary embodiment, the sequence check function may comprise two separate search phases and mechanisms, namely, a rules-matching function that is designed to match "sequence-oriented" packets by comparing a packet against the one or more firewall rules, and a legal sequence lookup function that checks whether this "sequence-oriented" packet follows a legal sequence by comparing the packet against stored sequence states.

Figure 5A:
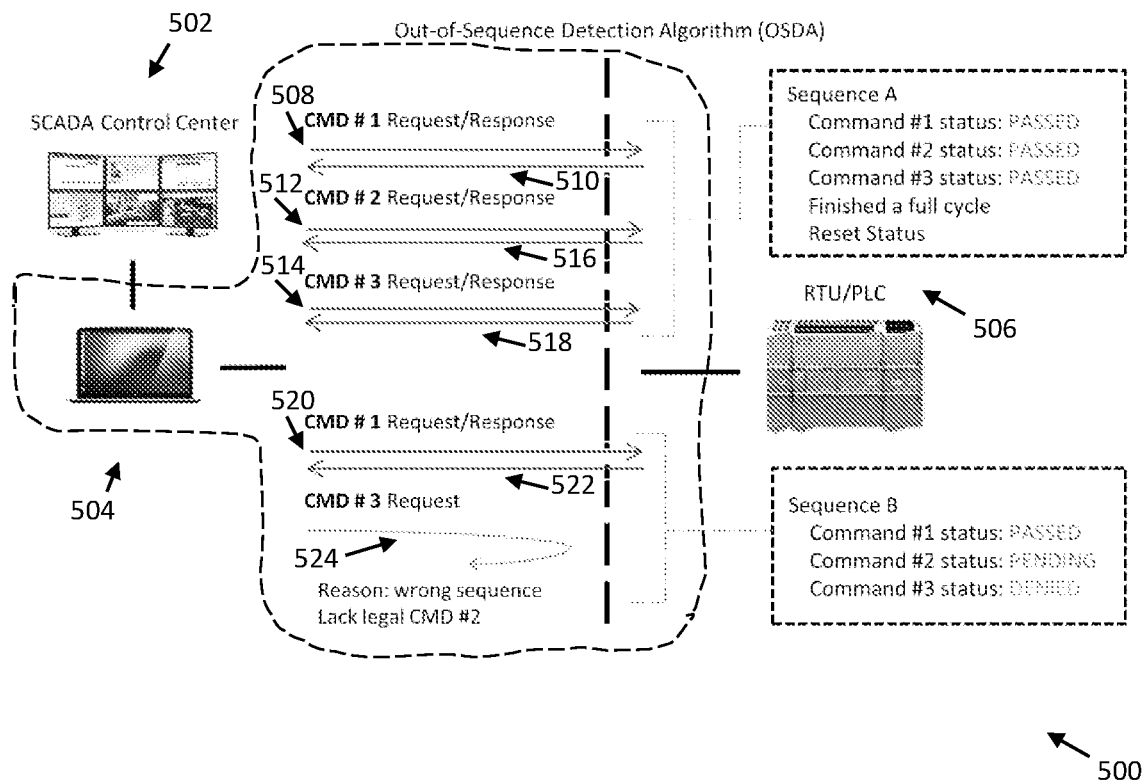
FIG. 5A is a schematic diagram illustrating an implementation of a sequence check function in an exemplary embodiment.

FIG. 5A is a schematic diagram illustrating an implementation of a sequence check function in an exemplary embodiment. The sequence check function is capable of detecting out-of-sequence commands.

In the exemplary embodiment, there is provided a SCADA system 500 comprising a SCADA control centre 502 (compare e.g. control centre 102 of FIG. 1A and control centre 114 of FIG. 1B), a firewall module 504 comprising a sequence check module (not shown) capable of implementing a sequence check function (or Out-of-Sequence Detection Algorithm (OSDA)) and a RTU/PLC 506 (compare e.g. one or more field data interface devices 106 of FIG. 1A and one or more RTUs and/or PLCs 118 of FIG. 1B). In the exemplary embodiment, the firewall module 504 comprises an inspection module, a firewall rules database as well as a sequence check database (not shown). The sequence check database may be configured e.g. to store data/information such as codes for the sequence check function, one or more legal sequences and sequence states (i.e. states indicating whether each command listed in a legal sequence has been received). In the exemplary embodiment, the firewall module 504 may further comprise or be coupled to a firewall memory (e.g. Random Access Memory (RAM)) which may store the sequence states (i.e. the sequence states may be stored in the memory instead of the database).

In the exemplary embodiment, a legal sequence may be e.g. first receiving/processing command #1, next receiving/processing command #2, followed by receiving/processing command #3, next recognising the end of a cycle (after receiving/processing the three earlier commands according to the legal sequence).

When it is determined that the three commands have completed a legal sequence, their stored sequence states may be reset.

In the exemplary embodiment, the SCADA control centre 502 may transmit commands in the order of CMD #1 (command #1), CMD #2 (command #2) and CMD #3 (command #3). In the exemplary embodiment, after the firewall module 504 determines that CMD #1 is part of a sequence, by conducting comprehensive packet inspection using the inspection module and determining that CMD #1 matches a known command of a sequence, the firewall module 504 may update the sequence states (e.g. "Command #1 status: PASSED") and allow CMD #1 to be transmitted to the RTU/PLC 506 (see arrow 508). The RTU/PLC 506 may transmit a response to the received CMD #1 (see arrow 510). In the exemplary embodiment, similar steps may be repeated for each subsequent command (i.e. CMD #2,CMD #3) received by the firewall module 504. In the exemplary embodiment, the subsequent commands received, being determined to be part of the same sequence Sequence A and in the correct order, are also allowed to be transmitted to the RTU/PLC 506 (see arrows 512, 514) and the RTU/PLC 506 may transmit responses to received CMD #2 and CMD #3(see arrows 516, 518). When the firewall module 504 determines that all the commands in the legal sequence (i.e. Command #1,Command #2 and Command #3) have been received in the order stipulated by the legal sequence, the firewall module is configured to determine that a full cycle of Sequence A is completed and the sequence states indicating respective receipt of the commands in the sequence are reset.

In the exemplary embodiment, the SCADA control centre 502 may next transmit commands in the order of CMD #1 (command #1) and CMD #3 (command #3). In the exemplary embodiment, after the firewall module 504 determines that CMD #1 is part of a sequence, by conducting comprehensive packet inspection using the inspection module and determining that CMD #1 matches a known command of a sequence, the firewall module 504 may update the sequence states (e.g. "Command #1 status: PASSED") and allow CMD #1 to be transmitted to the RTU/PLC 506 (see arrow 520). The RTU/PLC 506 may transmit a response to the received CMD #1 (see arrow 522). In the exemplary embodiment, a similar check/inspection is performed on incoming CMD #3. In the exemplary embodiment, the firewall module 504 determines that incoming CMD #3 is not being transmitted in accordance with the legal sequence (because there is a lack of legal CMD #2 which is being anticipated in the sequence after CMD #1). The firewall module 504 thus rejects CMD #3 by preventing CMD #3 from being transmitted to the RTU/PLC 506 (see arrow 524) and updates information on the sequence states accordingly (e.g. "Command #3 status: DENIED").

In the above described exemplary embodiments, the sequence check module is capable of checking the relevant stored sequence states when a command is received to determine whether the command is following a legal sequence. For example, CMD #3 is rejected if the stored sequence states indicate that CMD #1 is passed and CMD #2 being next in the sequence is still pending. In various exemplary embodiments, the sequence check function may comprise a rules-matching function and a legal sequence lookup function. The rules-matching function may be designed/configured to match "sequence-oriented" packets by comparing a packet against one or more firewall rules (see e.g. description of FIG. 3B). The legal sequence lookup function may be designed/configured to check whether the "sequence-oriented" packets are transmitted in accordance with a legal sequence by comparing each packet against a stored sequence state. In the exemplary embodiment, the rules-matching function is implemented before the legal sequence lookup function is implemented.

In some exemplary embodiments, the firewall module comprising the sequence check module is configured to allow a user to add a new legal sequence into a sequence check database of the firewall module.

Figure 5B:
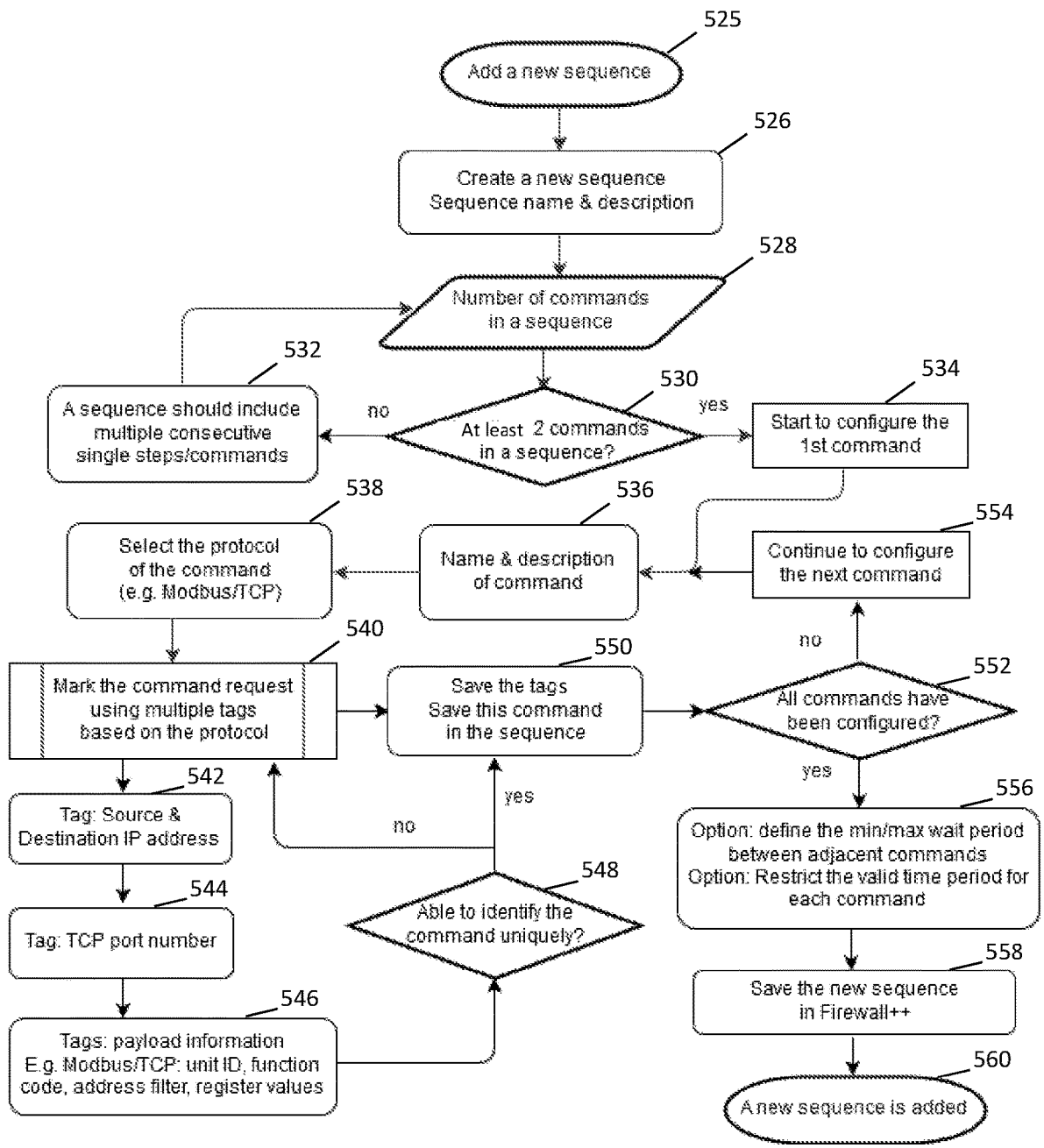
FIG. 5B is a schematic flowchart illustrating a method of adding a legal sequence into a sequence check database of a firewall module in an exemplary embodiment.

FIG. 5B is a schematic flowchart illustrating a method of adding a legal sequence into a sequence check database of a firewall module in an exemplary embodiment.

In the exemplary embodiment, in order to define "sequence-oriented" commands, one or more legal sequences (e.g. of SCADA commands) may be created in the sequence check database by a user.

At step 525, the user may elect an option to add a new sequence.

At step 526, a name and a description of the legal sequence to be inputted are provided. In the exemplary embodiment, operations (e.g. SCADA operations) may be accomplished by executing a series of consecutive commands (e.g. SCADA commands).

For example, the user may create a new legal sequence named as "switch on power supply", and may add a description that recites "switch on power supply of zone A, B, and C consecutively".

At step 528, the number of consecutive commands in the legal sequence is inputted. In the exemplary embodiment, the legal sequence may comprise at least two consecutive commands/steps. It is recognised that a single step operation (i.e. only one command) is without sequence. At step 530, if it is determined that there is one command input at step 528, the method proceeds to step 532. At step 532, it is indicated to the user that a legal sequence should include multiple consecutive single steps/commands (i.e. not less than two commands) and the process returns to step 528. If it is determined at step 530 that there are at least two commands input at step 528, the method proceeds to step 534.

At step 534, configuration of a first command is initiated. The configuration is to analyse and store information (e.g. both header and payload) of each consecutive command. The inspection module may be utilised/configured to retrieve the detailed payload information of a real-time command using comprehensive packet inspection. Thus, a sequence check module implementing a sequence check function may use the information as a reference to detect/analyse the command when the command appears in the SCADA network traffic (see FIG. 5A).

At step 536, a name and a description of the command are inputted by the user. For example, command #1 of a sequence may be named "switch on power supply" and the command may be used to switch on power supply of zone A.

At step 538, the industrial protocol of each command is indicated. A standard industrial protocol or a proprietary industrial protocol may be applied to execute the operation. In the exemplary embodiment, in a sequence, the protocols of each command may need to be indicated. Industrial protocols typically occupy a small portion in SCADA traffic. For example, Modbus/TCP are typically registered as TCP port number 502. Most packets that are not related to e.g. an out-of-sequence detection may be ignored by checking their protocols.

At step 540, a command request is marked using a plurality of tags based on the protocol. Marking may comprise indicating other/more header information of each command (for example at step 542, indicating source and destination IP address, MAC address, and flags if applicable, and at step 544 indicating TCP port number). Marking may also comprise indicating payload information of each command by using applicable tags (see step 546).

Payload frame format may vary depending on the industrial protocol. If a Modbus/TCP payload information is used as an example, for a Modbus/TCP command, the tags may include e.g. unit ID, function code, sub-function code, address filter, and register value. The format and values of these fields may be utilised to uniquely identify a single command.

At step 548, it is determined whether the command may be identified uniquely. For example, some criteria may be used for the determination on whether the command has been identified uniquely. The criteria may be, for example but not limited to, one or more of the following. As one example, based on the protocol/commands in a system, it may be determined that there should not exist two commands at the same time with identical source/destination IP addresses, TCP port number, payload structure and values of e.g., unit ID, function code, address filter, register values. At least one pair of the above fields or field values (i.e. a field or field value across two commands) may be used to differentiate two separate control commands. For example, the fields or field values may be checked using a lookup table or the like.

If the determination at step 548 is no, the method returns to step 540 for further marking of the command. If the determination is yes, the method proceeds to step 550.

At step 550, information of the command in the sequence is saved e.g. in a database.

At step 552, it is determined whether all commands in the legal sequence have been configured. If the determination is no, the method continues to configure the next command (see step 554) and returns to step 536. If the determination is yes (i.e. it is determined that the configuration of each single command in the sequence is finished), the method proceeds to step 556.

In the exemplary embodiment, header information and payload information may be provided to be as detailed as possible. The information is desirably sufficient for the firewall module implementing the sequence check function to be capable of detecting each command once the command appears in the SCADA network traffic (see FIG. 5A).

At step 556, further information/criteria relating to the legal sequence may optionally be added. For example, as one option, the minimum and maximum wait period between adjacent commands may be defined. Depending on the environment and applications, adjacent commands may be required to be sent within a certain waiting time/wait period.

For example, an application may involve an operator sending the next command after checking the result of a previous command. In such an application, one option may be to add a reasonable wait period between adjacent commands, such as five seconds. Thus, commands sent beyond this wait period may be regarded as out-of-sequence. Another option may be to restrict the valid period of each command. A further option may be to allow the user to set a valid/invalid period (e.g. based on clock time) for a command or a sequence, such as 10 am to 10 pm.

At step 558, the new sequence is saved in the firewall module.

At step 560, the legal sequence is added into the sequence check database of the firewall module for use.

In use, using the packet features (header and payload) defined in steps 538, 540, 542, 544 and 546, a "sequence-oriented" command may be picked out or filtered by the firewall module (see FIG. 5A). The inventors recognise that only a small portion of traffic belongs to "sequence-oriented" packets, and thus not all firewall rules may be configured for out-of-sequence detection. The inventors recognise that in many conventional firewalls, rules-matching typically involve a naive linear search process. This may also be the case for open source firewalls and iptables/netfilters.

Figure 6:
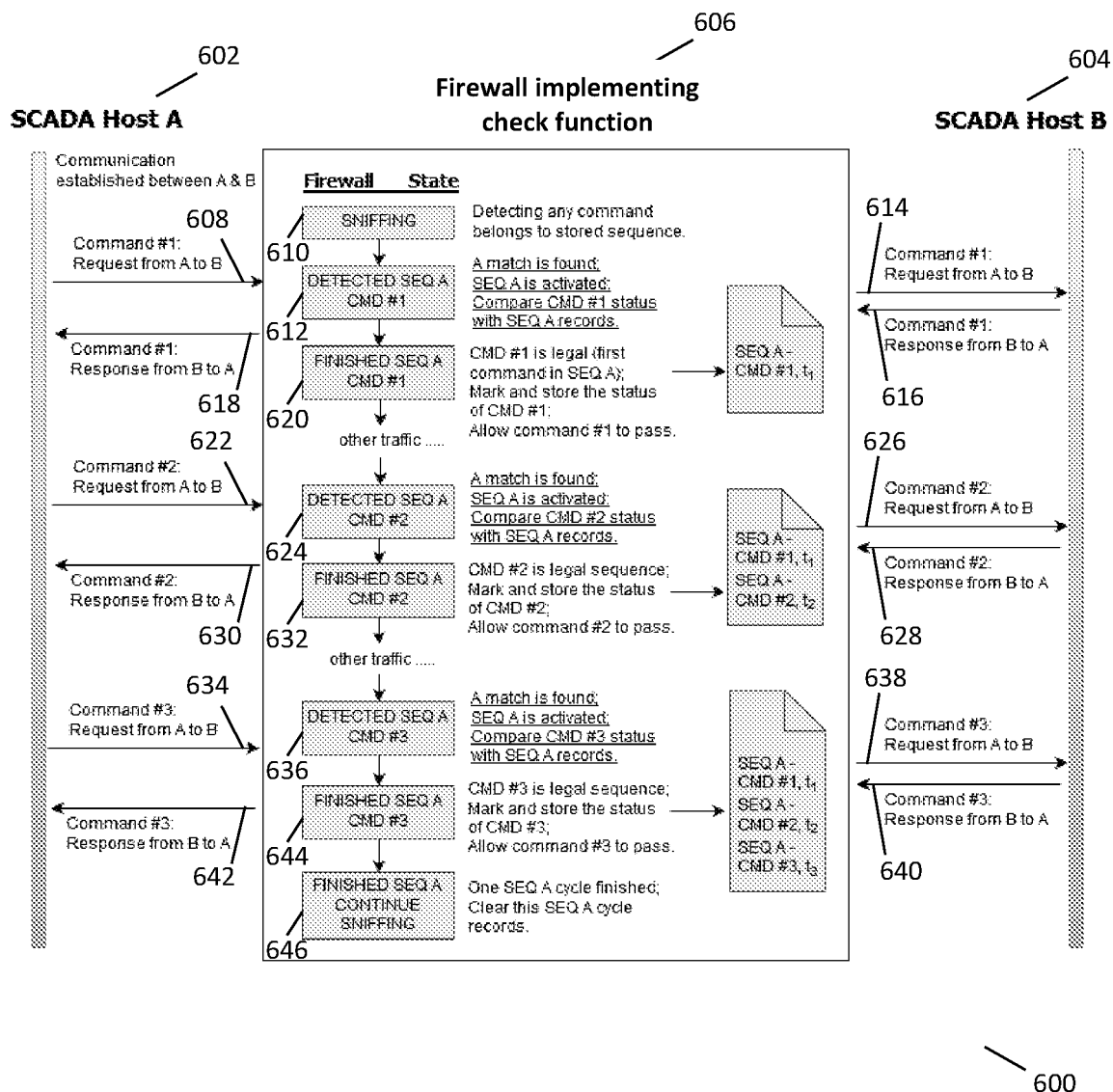
FIG. 6 is a schematic diagram for illustrating an implementation of a sequence check function in another exemplary embodiment.

FIG. 6 is a schematic diagram for illustrating an implementation of a sequence check function in another exemplary embodiment.

FIG. 6 shows a SCADA system 600 comprising two hosts (host A 602 and host B 604) that are in communication where packets are transmitted/received (e.g. SCADA command requests) through a firewall module 606 implementing the sequence check function. The firewall module 606 is capable of sniffing/inspecting SCADA traffic (via an inspection module of the firewall module) and alerting a user in case any command violates a pre-defined legal sequence (i.e. being out-of-sequence) of which the command is to be a part of. Once a sequence-oriented packet is detected, the packet undergoes a legal sequence lookup function. The function is to check whether the current command follows a pre-defined legal sequence applicable to the command itself by checking the latest sequence state (i.e. state indicating whether the command listed in the pre-defined legal sequence has been received or the current state of the legal sequence).

In the exemplary embodiment, the firewall module 606 sniffs/inspects the SCADA traffic between host A 602 and host B 604 (see 610). In the exemplary embodiment, multiple legal sequences (e.g. SEQ A, SEQ B, and SEQ C) may have been created and stored in a database of the firewall module 606 (or a sequence check database of the firewall module). The database may be used to look up sequence statuses/states by saving known sequence-oriented commands, and deciding the sequence correctness. In the exemplary embodiment, the firewall module 606 may continuously sniff/inspect the communication between host A 602 and host B 604.

When host A 602 transmits a first command request (e.g. CMD #1) to host B 604 via the firewall module 606 (see arrow 608), the firewall module 606 may inspect the command and search for or look up CMD #1 in the sequence check database. A match may be found and CMD #1 may be recognised as a sequence-oriented command. That is, the firewall module 606 may detect CMD #1 as SEQ A CMD #1 (see 612) or command number 1 of Sequence A. The lookup result may show that CMD #1 is the first command of SEQ A, and that this first command has not yet been received e.g. based on current sequence state. It is determined the SEQ A is activated. CMD #1 (and its status) may then be marked and stored together with a timestamp t1 in the sequence check database.

If the comparison result is positive at 612 i.e. that CMD #1 is part of a legal sequence, the firewall module 606 allows the CMD #1 request to pass (i.e. to be transmitted to host B 604; see arrow 614) and forwards the CMD #1 response from host B 604 to host A 602 (see arrows 616, 618). Thereafter, the firewall module 606 may determine that the necessary/applicable communication steps of CMD #1 have been completed (see 620).

If the comparison result is negative at step 612, an alert (in the form of e.g. a pop-up on a user interface module of a control centre or an alarm sounded through an audio member coupled to the control centre) generated via the firewall module 606 may be sent to notify the user. The command may also be denied or blocked depending on one or more firewall rules.

In the exemplary embodiment, host A 602 may send a second command request (e.g. CMD #2) to host B 604 (see arrow 622). The firewall module 606 may capture/inspect the command and search/look up CMD #2 in the sequence check database. A match may be found and CMD #2 may be recognised as a sequence-oriented command (see 624). The lookup result may show that CMD #2 is the second command of SEQ A, that CMD #1 has been received based on the stored sequence states, and that CMD #2 has not yet been received based on the stored sequence states. It is determined the SEQ A is activated. CMD #2 (and its status) may then be marked and stored together with the timestamp t2 in the sequence check database.

If the comparison result is positive at step 624 i.e. that CMD #2 is the next message/part of a legal sequence, the firewall module 606 allows CMD #2 request to pass (i.e. to be transmitted to host B 604; see arrow 626) and forwards the CMD #2 response from host B 604 to host A 602 (see arrows 628, 630). Thereafter, the firewall module 606 may determine that the necessary/applicable communication steps of CMD #2 are completed (see 632).

In the exemplary embodiment, host A 602 may send a third command request (e.g. CMD #3) to host B 604 (see arrow 634). The firewall module 606 may capture/inspect the command and search for or look up CMD #3 in the sequence check database. A match may be found and CMD #3 may be recognised as a sequence-oriented command (see 636). The lookup result may show that CMD #3 is the third command of SEQ A, that CMD #1 and #2 have been received based on the stored sequence states, and that CMD #3 has not yet been received based on the stored sequence states. It is determined the SEQ A is activated. CMD #3 (and its status) may then be marked and stored together with the timestamp t3 in the sequence check database.

If the comparison result is positive at step 636 i.e. that CMD #3 is the next message/part of a legal sequence, the firewall module 606 allows CMD #3 request to pass (i.e. to be transmitted to host B 604; see arrow 638), and forwards the CMD #3 response from host B 604 to host A 602 (see arrows 640, 642). Thereafter, the firewall module 606 may determine that the necessary/applicable communication steps of CMD #3 are completed (see 644).

In the exemplary embodiment, based on the sequence check database records, the firewall module 606 may determine that a full cycle of SEQ A has finished/been completed (see 646). The recorded sequence states (e.g. timestamps) of SEQ A in the sequence check database may thereafter be cleared or reset.

In the exemplary embodiment, additional criteria may be imposed when determining whether to allow packets (e.g. SCADA command requests) to be passed through the firewall module 606. For example, if the time between two adjacent commands (i.e. currently inspected command request and previously inspected command request) exceeds a pre-defined maximum waiting period, in the exemplary embodiment, the previously inspected command(s) may be cleared from the sequence check database, and the currently inspected command may be dropped/rejected.

In the exemplary embodiment, the firewall module 606 may continue sniffing/inspecting SCADA traffic between host A 602 and host B 604 thereafter.

In networks, a packet may be lost during transmission. For TCP, the same packet may be re-transmitted again if no response is received within a pre-determined period. In the exemplary embodiment, three consecutive commands namely CMD #1, CMD #2 and CMD #3 are expected in order to accomplish a full operation. In the exemplary embodiment, the second command (i.e. CMD #2) may be allowed to pass through the firewall module 606 only when the necessary/applicable communication steps relating to the first command #1 (i.e. CMD #1) have been completed, and this processing may similarly apply to the third command (i.e. CMD #3).

The inventors have recognised that issues with storage may arise in view of one or more exemplary embodiments for storage of user-configured sequential commands. Compare FIG. 5B. However, the inventors have also recognised that storage space needed for such exemplary embodiments may be significantly smaller than of current technologies. i.e. the amount of memory to be allocated as a database to store e.g. user-configured sequential SCADA commands need not be large. To memorise a single command, information in both header fields (e.g. source and destination IP addresses, port number) and payload (e.g. Modbus/TCP application-layer) are stored. For example, in a standard Modbus/TCP packet, the payload may include 10 to 30 bytes depending on different function codes. In a standard DNP3 packet, the payload may include more bytes. An empty TCP datagram may have a size of 64 bytes (without option).

The number of bytes which may exist in a single Modbus/TCP command with request ACK+response ACK structure is calculated as follows. In a request (A to B), a header may have 64 bytes and a payload may have 10-30 bytes. An ACK request (B to A) may have a header of 64 bytes and an empty payload. In a response (B to A), a header may have 64 bytes and a payload may have 10-30 bytes. An ACK response (A to B) may have a header of 64 bytes. Hence, in calculation, 300 bytes may be enough/sufficient to memorise a full command. Hence, a sequence with three consecutive commands may add up to 900 bytes to be memorised. The use of e.g. a hash-table or a search-tree may help/assist effectively to reduce the memory size needed. For example, the inventors have developed a hash-table based model that utilises ten times less memory space as well as lower time consumption to memorise a connection, by comparing to a Netfilter solution. A similar approach may be applied to store SCADA commands in a database of the firewall module in the exemplary embodiments. That is, instead of storing original command information, hash values may be used as entries in the database of the firewall module. For example, a standard Modbus/TCP command using hash function may be memorised as follows.

Entry=$H$ ash($Src\_IP, Dest\_P, Src\_port, Dest\_port,$
$unit\_ID,$ $function\_code,$ $register\_addr,$
$register\_value$)

In various exemplary embodiments, if each command only requires a few hundred bytes and only a relatively small portion of traffic belongs to "sequence-oriented" packets, the firewall memory (such as RAM) may be sufficient to store e.g. the states of sequence commands instead usage of a dedicated database or another storage medium.

The inventors have recognised that modern SCADA infrastructures largely make use of information and communication technologies to monitor and control the states of each part/component. A critical state may be an insecure state or an unstable state existing in the SCADA system infrastructures in relation to e.g. voltage level, air or liquid pressure, temperature and speed. Critical states should be avoided due to safety concerns. However, it is recognised that an attacker may forge and send a single packet or a series packets using necessary industrial protocol to a certain component of the SCADA system, such as RTU or PLC. The execution of such packets may actively modify the states of the devices (or components of the SCADA system) and hence drive the devices or even the whole SCADA system from a normal state (or called/referred to as secure state) into a critical state (or called/referred to as insecure state). Besides such attacks, a critical state may also be generated due to human errors by operators.

The inspection module of described exemplary embodiments may be utilised to carefully inspect the application content of packets to detect the malicious packets before such packets affect the SCADA system states. To achieve this, using comprehensive packet inspection, it is possible to calculate the estimated distance between the current state and the critical state. It may also be desired for a firewall module to be able to provide an early warning if the execution of an incoming command may bring the SCADA system into a pre-defined critical state. In other words, in some exemplary embodiments, the firewall module may desirably be able to forecast an approaching critical state. Hence, in some exemplary embodiments, the firewall module being capable of inspecting the application content of commands through the inspection module may record the states based on the inspected content of commands and monitor whether the instructed states approach the critical state.

In some exemplary embodiments, each critical state e.g. of each component/part/device of an industrial control system may be stored in a system state database. The firewall module implementing comprehensive packet inspection may determine the instructed state of each command transmitted through the firewall module. The firewall module may be configured to monitor the distance between the instructed states and the critical states.

The inventors have also recognised that attackers may always be developing more advanced technologies to exploit SCADA system vulnerabilities and launch attacks without being detected by existing firewall solutions, such as zero-day attack. The inspection module of described exemplary embodiments may provide a firewall module with a capability of searching for unknown anomaly/abnormal activities in a SCADA system. The inspection module may help/assist to detect anomaly activities by inspecting suspicious application content and comparing them against historical records. Administrators/users may be alerted in advance if anomaly activities are detected. Examples of anomaly SCADA activities may include a replay attack (i.e. an attacker re-uses captured legitimate industrial commands (e.g. Modbus) with appropriate modification in application content), a SCADA-DoS attack (i.e. an attacker forges a series of meaningless industrial packets (e.g. Modbus) and tries/attempts to consume the limited resources of certain devices, such as RTU and SCADA server), an insider attack (i.e. an insider improperly uses the industrial commands that may threaten the SCADA security) etc.

The inventors have recognised that with increased inspection of data in the exemplary embodiments, e.g. comprehensive packet inspection of every application field, sequence check etc., there may be issues with network latency. In an exemplary embodiment, a firewall module capable of implementing an index-based rules matching function for an inspection module is provided. The codes for the index-based rules matching function may be stored e.g. in a firewall rules database of the inspection module.

The inventors recognise that rules matching optimisation SCADA systems are not typical IT systems. The primary goal of IT security is directed at the concern about protecting data privacy whereas one primary goal of SCADA security is directed at the concern of protecting process availability. Low network latency may be a significant consideration when designing security approaches, such as a firewall, for a SCADA system to ensure normal operations. In an industrial protocol packet, the length of payload may vary from several bytes to dozens of bytes depending on the complexity of the protocol. It may be expected that higher network latency may be generated if a longer payload is to be inspected by using comprehensive packet inspection implemented by the inspection module. The working theory of traditional rules matching algorithm is to compare an incoming packet against an entire set of rules one by one until a first-match is found. However, the inventors have recognised that such an algorithm may not be an optimised choice to accelerate the operation speed of comprehensive packet inspection by the inspection module.

To reduce the potential rules-matching latency in comprehensive packet inspection by the inspection module of an industrial control system, in the exemplary embodiment, an index technique may be utilised and an index-based rules matching function may be provided. Indexing is a data structure technique to sort a number of records on multiple fields and efficiently retrieve the required records from database files by using a number of attributes. In the exemplary embodiment, indexing may be applied e.g. to sort firewall rules of the inspection module. In the exemplary embodiment, in order to implement the index-based rules matching function, the SCADA system may comprise one or more of the following attributes.

In the exemplary embodiment, for a first attribute, information in an application content may be categorised into indexes. An index map for each industrial protocol may be built and stored in a SCADA firewall library (e.g. stored in a RAM). In the exemplary embodiment, information in the application content may be categorised into multiple segments. In the description herein, each segment may refer to one or multiple fixed bytes that are used to present on operation function, one storage address, or other usages. One segment may refer to one index. Further, each industrial protocol may have their own payload data structure to comply with or follow, whether it is a standard or proprietary protocol. Hence, an index map may be created for each protocol. In the exemplary embodiment, the inspection module may be capable of inspecting payload according to the index map stored. Examples of how the indexes may be defined are shown in FIG. 7.

FIG. 7 is a table illustrating indexes in a payload of Modbus Functions 8 and 15 in an exemplary embodiment.

In the exemplary embodiment, in a payload of Modbus function code 8 ("diagnostics"), there may be provided the following indexes—unit ID (1 byte at byte 0), function code (1 byte at byte 1) and sub-function code (1 byte at byte 2).

In a payload of Modbus function code 15 ("write multiple coils"), there may be provided the following indexes—unit ID (1 byte at byte 0), function code (1 byte at byte 1), start address (2 bytes at byte 2 to 3), number of addresses (2 bytes at byte 4 to 5), byte count (1 byte at byte 6) and write value (2 bytes at byte 7 to 8).

In the exemplary embodiment, for a second attribute, according to different values of each index, comprehensive packet inspection related rules utilised by the inspection module may be sorted orderly and be available to be searched when there is an incoming packet.

In the exemplary embodiment, a single firewall rule (for comprehensive packet inspection) may comprise multiple pre-defined indexes and user-defined values for each index. In the exemplary embodiment, the index-based rules matching function may match an applicable rule with each incoming packet using minimum time. The firewall rules may be sorted orderly and be available to be searched (using e.g. the index-based rules matching function). In the exemplary embodiment, sorting techniques that are known may further be applied. Some of these techniques may be extended to sort the values in firewall rules. The computation complexity from different techniques may however be different. For example, based on a binary search tree, values within a same index may be sorted in an ascending/descending order. The binary searches lookup complexity may be O (log n) with n records.

Hash-table is another technology that may be used to compute an index into an array of buckets of slots, from which a desired value may be found. Some modern hash-table data structure may achieve O (1) constant lookup time in worst case scenarios. Hashing and indexing may be introduced together to reduce packet matching time. In particular, the hash-table technique may be used to sort and search SCADA firewall rules. However, the inventors have recognised that there may be challenges to adopt this technology for rule matching optimisation. For example, the number of editable register addresses may be larger than in the tens of thousands, and similar numbers apply for register value. The probabilities of combination(s) of various parameters may thus be large, and additional storage may be needed to store the hash values. Further, additional concerns (e.g. collision handling) may have to be taken into consideration if the hash-table technique is to be used.

In the exemplary embodiment, for a third attribute, an incoming packet may be searched against an entire multi-level index tree to match the right rule without searching the rules one by one.

In the exemplary embodiment, the multi-level index tree may be built if the firewall rules are sorted orderly. A balance tree or B-tree structure may be one of the types of index algorithms/functions which use pointers and multiple layers of nodes in order to quickly locate desired data.

Figure 8:
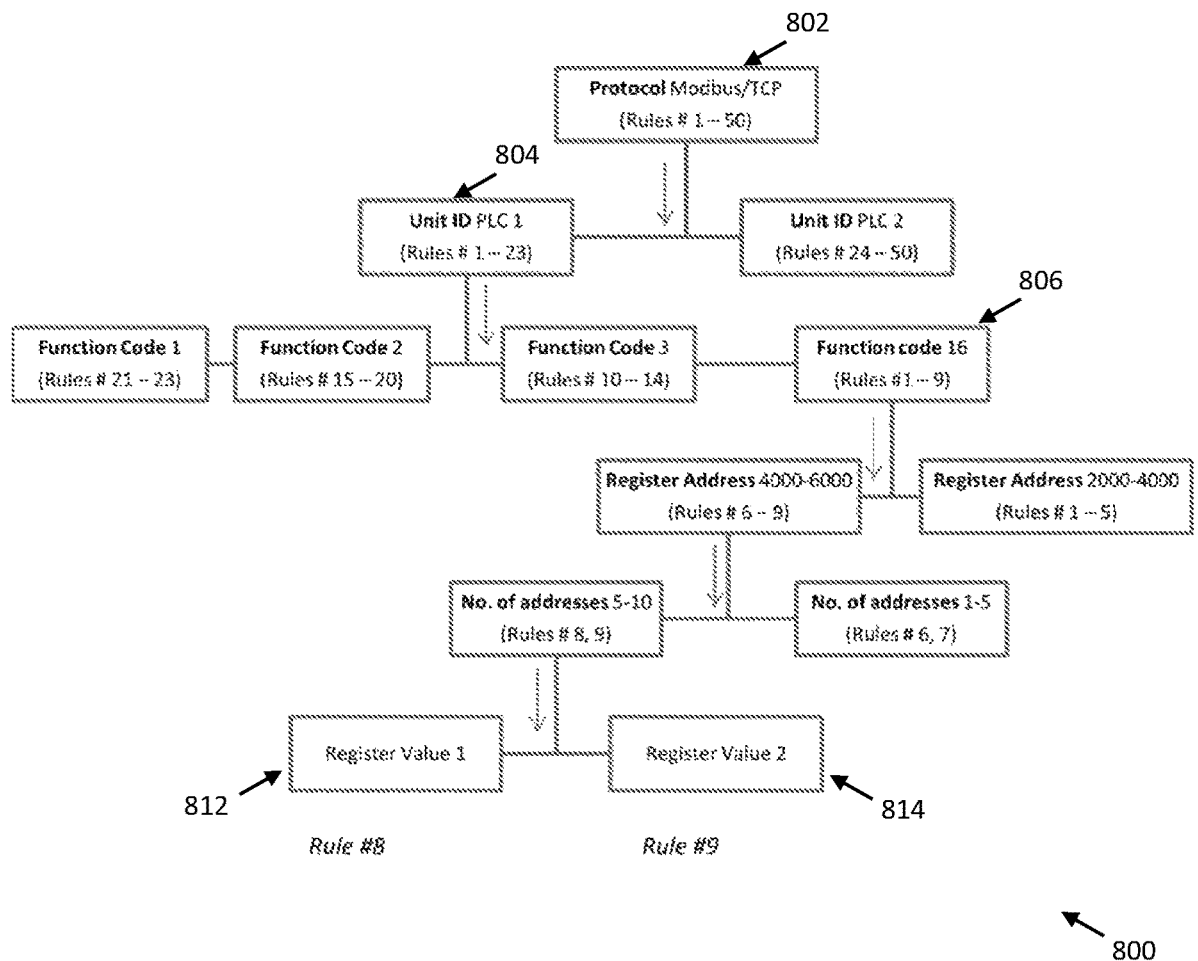
FIG. 8 is a schematic diagram illustrating a multi-level index tree of an index-based rules matching function in an exemplary embodiment.

FIG. 8 is a schematic diagram illustrating a multi-level index tree of an index-based rules matching function in an exemplary embodiment.

In the exemplary embodiment, when a new incoming packet enters or is inspected by a inspection module, the inspection module implementing the index-based rules matching function may be configured to start at the root index of the multi-level index tree 800 and navigate downwards in order to find a final rule that matches all the desired index values. In the exemplary embodiment, there may be provided 50 firewall rules for a Modbus protocol (see 802 "Rules #1-50"). Unit ID may be the first index to be inspected. If the unit ID is 01 (e.g. referring to PLC 1), the inspection may be narrowed to rules which relate to a unit ID index value equalling to 01 for further comparison (see 804 "Rules #1-23"). Similar steps for the remaining indexes (i.e. function code, register address, number of addresses, register value) may be carried out until the inspection module identifies a final rule that matches all the desired index values.

For example, function code may be the second index to be inspected. If the index value for function code is 16, inspection is further narrowed to "Rules #1-9" (see 806 "Rules #1-9"). The inspection may navigate downwards to arrive at rule #8 or #9 (e.g. applicable to Register Value 1 or Register Value 2 respectively). See numerals 812, 814.

In the exemplary embodiment, the use of the index-based rules matching function (which may utilise a multi-level index tree) may allow an application content to be inspected comprehensively.

The inventors have recognised that not all industrial vendors may apply standard industrial protocols in their systems. On the other hand, traditional DPI may not be scalable to inspect and protect the traffic of proprietary industrial protocols. Development kits and APIs (Application Programming Interfaces) may not always be provided to allow users to create their own proprietary protocols and to configure a customised DPI module. In an exemplary embodiment, the firewall module may comprise a protocol creation module that is capable of allowing users to input their proprietary protocol and to configure/edit customised firewall rules. Users may create a proprietary protocol by defining its payload frame in a firewall rules library (e.g. stored in a RAM), and configure customised rules according to the payload frame.

Two examples (of Modbus commands that may be utilised in a SCADA system) are provided below to illustrate desirability in exemplary embodiments to configure firewall rules.

In a first example, it is assumed that registers with addresses 40001 to 40016 are configured as editable. This may be achieved with the help of existing SCADA DPI. However, a user may wish to further configure these registers such that they are not allowed to be written into certain values (e.g. 11 (hex)).

In a second example, Modbus function code 8 is typically used for diagnostics purpose. A user may wish to further deny any request of restarting communication (sub-function 01) and forcing a device into listen-only mode (sub-function 04) due to safety concerns.

In the exemplary embodiment, the protocol creation module implements a protocol creation function (or referred to as an "Industrial Protocols Creation Algorithm" (PIPCA)). The function/algorithm may expand the capability of the firewall module to add and inspect a proprietary industrial protocol systematically. In the exemplary embodiment, the inspection module of the firewall module may perform comprehensive packet inspection on a proprietary industrial protocol by referencing a stored payload frame/structure. The design of the function/algorithm may take into consideration the features of the protocol structure of typical industrial protocols (e.g. Modbus). Two main features are discussed below.

As a first feature, it is recognised that typical industrial protocols may contain extensions to support transmissions over TCP/IP or UDP/IP. For example, TCP port number 502 may be registered to transmit Modbus/TCP; DNP3 may be transmitted over TCP port number 20,000; TCP port numbers 4840 and 4843 may be registered for OPC; EtherNet/IP may make use of unknown TCP port number 44818 for explicit messaging and UDP port number 2222 for implicit messaging. Although TCP may be more common in SCADA networks presently, some existing legacy systems may still apply pure UDP. Hence, both protocols may be considered in the design of the function/algorithm. Further, a request-response mode may be used between a SCADA master(s) and slave(s). Hence, multi-way communication may be incorporated.

As a second feature, it is recognised that an industrial protocol follows its payload frame format that comprises various pre-defined layers and fields. The payload frame of an industrial protocol is typically straightforward. Every bit or byte in the payload may have a traceable position and a unique function. A field with a defined length of bits/bytes may be a basic unit in a payload. For example, Modbus function code field, unit ID field, and address field were previously described (see e.g. FIG. 4). A field may be described in five attributes, namely, name, function, data type, length, and version. For example, the function code field may be a 1-byte long, unsigned integer field that is used to numerate different Modbus functions. It may exist in any Modbus versions. A reader may further refer to "https://www.wireshark.org/docs/dfref/m/mbtcp.html" for referencing more fields in the Modbus protocol as well as for other industrial protocols. A layer may be understood as a ground of fields. Based on e.g. FIG. 2, there may be two layers in a Modbus/TCP payload, a MBAP header (e.g. MPAB Header 212) and PDU (e.g. Modbus Payload/PDU 214).

Figure 9A:
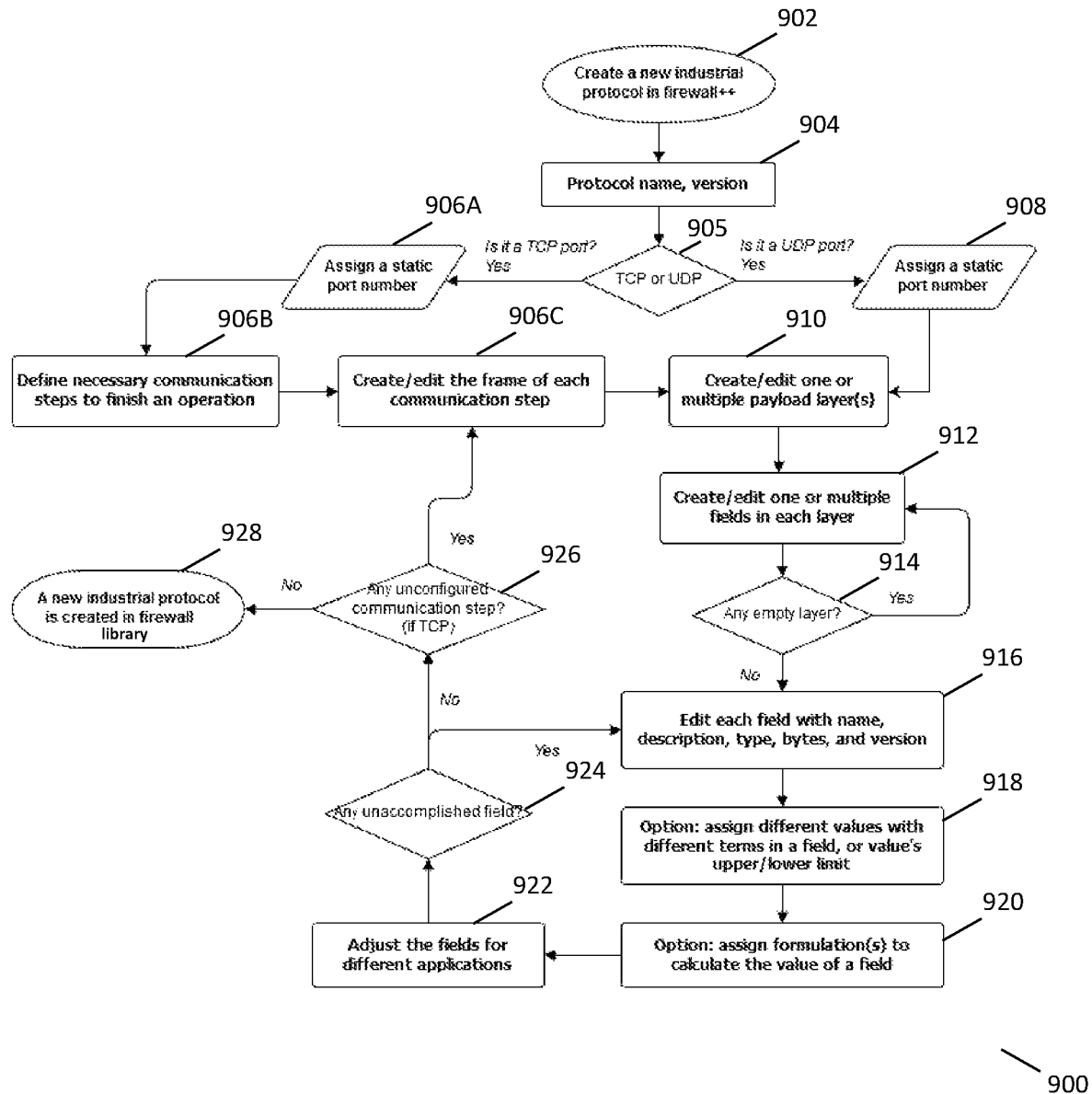
FIG. 9A is a schematic flowchart illustrating a method of creating and storing a protocol in an exemplary embodiment.

FIG. 9A is a schematic flowchart illustrating a method of creating and storing a protocol in an exemplary embodiment. The method may be implemented by a protocol creation module of a firewall module.

In the exemplary embodiment, the method of creating and storing a protocol (via the protocol creation function or referred to as the Proprietary Industrial Protocols Creation Algorithm (PIPCA)) may comprise the following steps.

At step 902, the user is allowed to create a new industrial protocol in the firewall module using the protocol creation module.

At step 904, an industrial protocol name and version are defined/input by the user. An industrial protocol may have multiple versions, such as 1.0.1 and 1.0.2.

At step 905, TCP/IP or UDP/IP is chosen as the transport layer protocol. It is appreciated that UDP is stateless and has been abandoned by most industrial networks. TCP multi-way communication may be utilised in master-slave mode operations, such as Modbus request and Modbus response.

If TCP/IP is chosen as the transport layer protocol at step 905 (i.e. a TCP port is used), the method proceeds to step 906 A, and if UDP/IP is chosen as the transport layer protocol at step 905 (i.e. a UDP port is used), the method proceeds to step 908. At both steps 906A and 908, a static port number is assigned to the new industrial protocol. Each industrial protocol may have a registered/fixed port number for ease of tracing among network traffic.

After step 906A is completed, the method proceeds to step 906B. At step 906B, the necessary/applicable communication steps for completing an operation are defined. Typical industrial protocols, such as Modbus over TCP, may use Request Response and ACK ACK steps to accomplish an operation, such as read a register value, or write a new value to a register. For example, see request/response format of a Modbus/TCP operation in FIG. 5A.

Therefore, at step 906C, the user defines the payload frame format of both a request packet and a response packet. Thus, a frame may be created or edited for each communication step. Some proprietary protocols may use more communication steps to finish a single operation.

After step 906C or 908, the method proceeds to step 910. At step 910, one or multiple payload layers may be created or edited.

At step 912, one or multiple fields under each payload layer are created or edited.

At step 914, it is determined whether there are any empty layers. If there are empty layers, the method returns to step 912. If there are no more empty layers, the method proceeds to step 916.

At step 916, a name, description, type, bytes and version of each field are edited.

For the above steps, one example is provided using a Modbus/TCP payload as an example (see e.g. FIG. 2). In this example, MBAP and PDU may be created as two layers (at step 910). In the MBAP layer, there may be four fields created (at step 912). In the PDU layer, the number of fields created may depend on the function code and request/response (also at step 912). In this example, the user may create all necessary/applicable layers and fields, and regulate the field combinations and sequences under different functions (e.g. by editing each field at step 916). For example, the fields in the PDU layer of a Modbus/TCP function code 6 (write a single register) request packet may be edited to include a function code (1 byte unsigned integer), followed by address (2 bytes unsigned integer), and followed by register value (2 bytes unsigned integer).

At step 918, terms may be assigned to different field values, and/or upper/lower limits of values may be set. This step may be an optional step and may be skipped in some exemplary embodiments. For example, for a Modbus function code field, the user may assign terms to different values, such as 01 (Read Coils), 02 (Read Discrete Inputs), 03 (Read Holding Registers), and so on. In the exemplary embodiment, this step may help the user to remember the functions of different values, and setup firewall rules relatively easily.

The user may also set an upper limit, such as 0A (10 in decimal), which may mean that any value above 0A is disregarded or becomes useless.

At step 920, a formulation to calculate the value of a field may be assigned. This step may be another optional step and may be skipped in some exemplary embodiments. In some proprietary protocols, the value of a field may be calculated by using the values of other fields. For example, the value of length may be calculated by n*2, where n is the number of total bytes in a TCP payload, and the value n is obtained from another field.

At step 922, the fields may be adjusted for different applications.

At step 924, it is determined whether there is any field/layer where the configuration has not been accomplished. If there are field(s)/layer(s) where the configuration has not been accomplished, the method returns to step 916. If the configuration of every field/layer has been determined to be accomplished at step 924 and UDP/IP was chosen as the transport layer protocol at step 904 earlier, the method skips step 926 and proceeds to step 928 where the method ends (i.e. a new protocol is created and stored in the firewall library). If the configuration of every field/layer has been determined to be accomplished at step 924 and TCP/IP was chosen as the transport layer protocol at step 904 earlier, the method proceeds to step 926.

At step 926, it is determined whether there are any unconfigured communication steps. If it is determined that there is still a TCP communication step that has not been configured, the method returns to step 906C. If it is determined that each TCP communication step has been configured, the method proceeds to step 928 where the method ends.

In the exemplary embodiment, after the new industrial protocol is created and stored in the firewall library, the firewall module is capable of recognising the frame format of the new proprietary industrial protocol.

In the exemplary embodiment, comprehensive packet inspection rules may be set to test the filtering performance of the inspection module.

In the exemplary embodiment, for the firewall module to have more advanced filtering capabilities (e.g. to even better filter malicious traffic in a SCADA system), more advanced customised options (i.e. criteria for filtering) may be designed and added for each firewall rule. Some examples are listed in Table I below.

TABLE I

Examples of customised options in firewall rules configuration (for comprehensive packet inspection)

| Advanced options | Description | Example |
| --- | --- | --- |
| Time Interval | Set a time interval (e.g. in minutes, hours, days). The rule is valid or invalid within this interval. | Modbus function code 8-8 is not allowed to be called except 8-9PM every day. |
| Authentication | Call authentication interrupt under certain/pre-defined condition. (Additional authentication software/hardware to be used) | If Modbus function code 8-8 is called outside 8-9PM for special reason(s), authentication is required. |

For example, a firewall rule may be created or modified/edited to include e.g. a valid time period for commands to be passed through the firewall module. For example, a firewall rule may be created or modified/edited to include e.g. a time period for a request for authentication to be activated for commands to be passed through the firewall module.

Figure 9B:
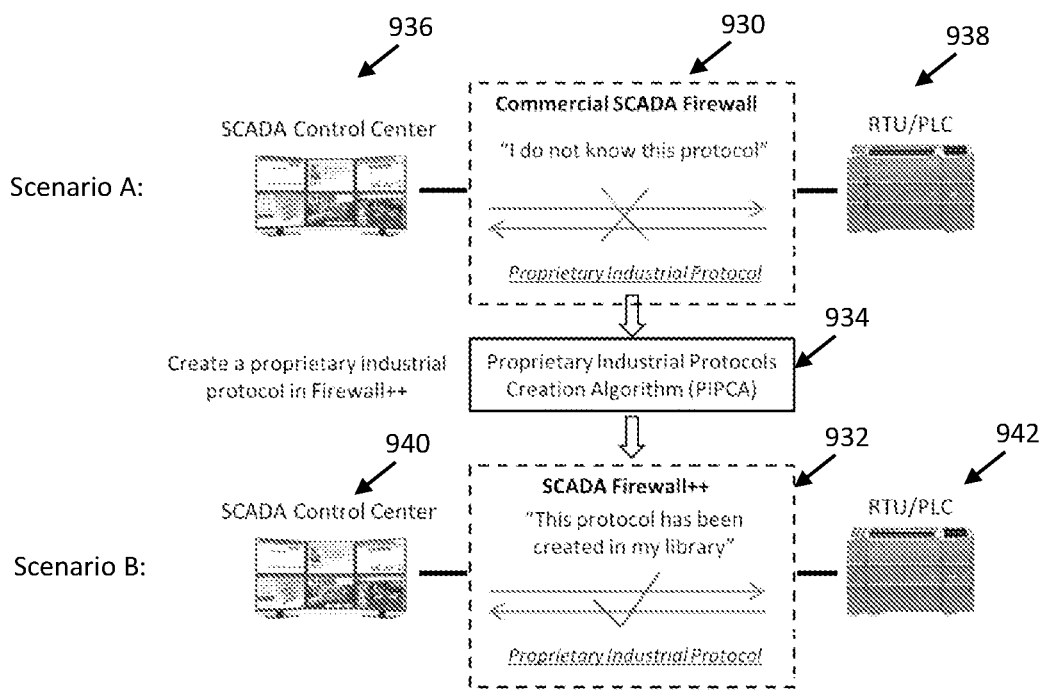
FIG. 9B is a schematic diagram illustrating the differences in capabilities of a typical SCADA firewall and a firewall module in an exemplary embodiment.

FIG. 9B is a schematic diagram illustrating the differences in capabilities of a typical SCADA firewall and a firewall module in an exemplary embodiment.

In the exemplary embodiment, the typical SCADA firewall 930 and a SCADA Firewall++ (or the firewall module) 932 are provided under scenario A and scenario B respectively. One difference between the typical SCADA firewall 930 and the firewall module 932 is that the firewall module 932 is additionally capable of creation of and storage of a proprietary industrial protocol in its firewall library through a protocol creation function 934 (or referred to as a Proprietary Industrial Protocols Creation Algorithm (PIPCA)) (see FIG. 9A). In the exemplary embodiment, with the proprietary industrial protocol stored in the firewall library, the firewall module 932 is capable of inspecting data and allowing the data to pass through the firewall module 932 when it is determined that the data is in accordance with the proprietary industrial protocol.

Under scenario A, a SCADA control centre 936 and a RTU/PLC 938 are provided. Communications between the SCADA control centre 936 and the RTU/PLC 938 are not permitted (i.e. data are not allowed to pass through the typical SCADA firewall 930) because although the data being exchanged between the SCADA control centre 936 and the RTU/PLC 938 are in accordance with the proprietary industrial protocol, the typical SCADA firewall 930 does not recognise the proprietary industrial protocol and therefore cannot inspect the data being transmitted between the SCADA control centre 936 and the RTU/PLC 938.

In the exemplary embodiment, under scenario B, a SCADA control centre 940 (functions substantially the same as the SCADA control centre 936) and a RTU/PLC 942 (functions substantially the same as the RTU/PLC 938) are provided. In the exemplary embodiment, communications between the SCADA control centre 940 and the RTU/PLC 942 are permitted (i.e. data are allowed to pass through the firewall module 932) because the data being exchanged between the SCADA control centre 940 and the RTU/PLC 942 are in accordance with the proprietary industrial protocol stored in the firewall library of the firewall module 932 such that the firewall module 932 is capable of inspecting the data being exchanged (between the SCADA control centre 940 and the RTU/PLC 942) and determining that the data is in accordance with the proprietary industrial protocol.

The inventors have recognised that existing DPI functions have drawbacks because whole information in the application content of a packet/message is not inspected and the existing DPI functions do not support proprietary industrial protocols. The described exemplary embodiments may provide an industrial control system comprising an inspection module that may aim to address those drawback(s). The described exemplary embodiments may also provide more security features to protect e.g. a SCADA system from advanced attacks, such as in the form of out-of-sequence commands, critical states and anomaly/abnormal activities. In some described exemplary embodiments, a sequence check module implementing a sequence check function (or referred to as an Out-of-Sequence Detection Algorithm (OSDA)) may be provided to detect out-of-sequence commands in the SCADA system. Further, in some exemplary embodiments, a protocol creation module implementing a protocol creation function (or referred to as a Proprietary Industrial Protocols Creation Algorithm (PIPCA)) may be provided to increase the capability of the firewall module to add (e.g. into a Random Access Memory) and to protect proprietary industrial protocols. Some described exemplary embodiments may further provide an index-based rules matching algorithm/function to reduce firewall latency.

The described exemplary embodiments may provide an inspection module for industrial control systems, in particular, a comprehensive packet inspection framework for a Supervisory Control and Data Acquisition (SCADA) network. The inspection module may be utilised to detect and prevent advanced security threats, such as in the form of out-of-sequence commands, commands instructing approaching critical states, and anomaly/abnormal activities, which may appear in SCADA systems. In the described exemplary embodiments, a method may be provided comprising inspecting the header fields and data fields of a communication protocol of an industrial control system, (the header fields and data fields including command and/or function code and/or sub function codes, either standard or customised); inspecting network layer information in a command against firewall rules; inspecting the length and format of a payload so that malicious or abnormal data may be rejected at an early stage; inspecting the first bit/byte to the last bit/byte in the payload against pre-configured firewall rules; and wherein the comprehensive inspection is configured to restrict the packets carrying bad/malicious values in the payload to be transmitted.

Some described exemplary embodiments may provide a sequence check module of an industrial control system that is capable of implementing a sequence check function (or referred to as an Out-of-Sequence Detection Algorithm (OSDA)) to detect out-of-sequence commands in industrial control systems, such as a SCADA system. In the described exemplary embodiments, a method may be provided which comprises determining the relationship between real-time incoming commands and stored historical commands, where the stored historical commands may be unique values of tags such as, but not limited to, source and destination, function codes, sub-function codes, editable addresses, and register values; tracking active commands beyond the connection-level states by comparing sequence oriented packets against a set of predefined firewall rules; comparing each sequence-oriented packet against stored sequence states to determine whether the sequence-oriented packet follows an authorised sequence as defined in the set of predefined firewall rules; wherein the authorised sequence of commands may be predefined or user defined, and added to a set of other predefined firewall rules.

Some described exemplary embodiments may further provide a method of optimising rule matching to match a right/correct rule with each incoming packet using a minimum amount of time. The method may comprise categorising all information in the application content into indexes (segments), building an index map for each protocol, and storing the index map in an industrial control system firewall (or SCADA firewall) library, wherein each firewall rule may comprise multiple indexes and user-defined values in each index.

Some described exemplary embodiments may provide a protocol creation module of an industrial control system that may facilitate carrying out a method of generating proprietary industrial protocols (e.g. through a protocol creation function or PIPCA) by extending the structure features of conventional industrial protocols to enable multi-way communication to complete a single operation step, and/or create and/or edit multiple payload layers.

The inventors have recognised that an effective SCADA firewall may need to dig deeper enough into the content of payload to understand the detailed SCADA application that is being executed by introducing DPI technique. However, the inventors have recognised that the security features in many existing SCADA firewalls may still have drawbacks in several aspects, such as a non-comprehensive deep packet inspection on the payload, and poor compatibility as well as scalability for proprietary industrial protocols. The described exemplary embodiments may provide a firewall or firewall module that may address one or more of the above drawbacks as well as deliver advanced security features. The described exemplary embodiments may provide a firewall module comprising an inspection module. The inspection module is configured to perform comprehensive packet inspection. The inspection module may be further utilised to detect and prevent advanced security threats, which may be in forms such as out-of-sequence commands, commands instructing approaching critical states, and anomaly/abnormal activities, which may appear in SCADA systems.

It is recognised that a SCADA firewall is a network security device that inspects each packet entering and leaving an industrial network, and decides whether a packet should be accepted or dropped by matching it against a list of pre-configured firewall rules. In contrast to traditional enterprise network-based firewalls, SCADA firewalls are typically specially designed to secure industrial protocols and applications. The inventors have recognised that many fundamental capabilities that exist in existing IT firewalls may have been inherited into existing SCADA firewalls to check the fields up to network layer only. However, the inventors have recognised that traditional SCADA DPI may be evaluated/regarded as a partial application inspection because not all the fields in the application content are to be inspected. For example, the application content in an industrial protocol packet could also include an operation sub-function field (e.g. different options for diagnostics), a register value field (e.g. overwrite new values to registers) and customised service fields depending on protocols.

The inventors have recognised that a lack of inspection of the above fields in the application content may make a firewall vulnerable to malicious packets that aim to attack the SCADA system. For example, an attacker may forge a malicious industrial protocol packet that is used to write new values to certain register addresses, and send it remotely to a PLC for execution. The inventors have recognised that existing SCADA firewalls are not able to recognise such a packet as a malicious packet as long as it uses legal operation function (writing), unit ID, and register address. The register values in the malicious packet may have been modified by the attacker but with existing SCADA firewalls, such values are not inspected. The attacker may exploit this drawback to realise his/her goal to manipulate or corrupt the devices in a SCADA system.

The described exemplary embodiments may provide an inspection module to perform comprehensive packet inspection (instead of partial inspection) which may be employed in the SCADA firewall. The inspection module may usefully inspect all the data bytes in the application content against pre-configured firewall rules. Depending on different industrial protocols, not only the values of operation functions, targets and editable addresses, but also the values of sub-function options, register values and other customised services may be restricted within safe ranges through firewall rules configuration. The described exemplary embodiments may thus make it possible for a firewall module to detect and prevent potential malicious packets. Furthermore, the inspection module implementing comprehensive packet inspection may make it possible to detect and prevent advanced security threats, such as in the form of out-of-sequence commands, commands instructing approaching critical states, and anomaly/abnormal activities. These may appear in a SCADA system.

The inventors have also recognised that a lack of scalability for proprietary industrial protocols is another drawback that may exist in traditional SCADA firewalls. SCADA systems may use typical industrial protocols, such as Modbus, DNP3, and EtherNet/IP. These may follow standardised port numbers and payload frames. However, there are SCADA systems that use proprietary protocols. The inventors have recognised that existing SCADA firewalls may not able to perform DPI for the proprietary protocols. Some exemplary embodiments may allow users to add proprietary protocols into e.g. a firewall library and to make customised firewall rules. In addition, the inventors recognise that real-time communication and low latency firewall inspection may be critical for SCADA systems. In theory, latency may increase if much longer data bytes in a payload is to be inspected by an inspection module. To use a minimum amount of time to match an incoming packet with a correct firewall rule, a feature of indexing may be utilised in an index-based rules matching function of some exemplary embodiments.

The described exemplary embodiments may provide an advanced firewall solution employed to monitor and control data traffic and hence enable a SCADA system to be more immune to intelligent cyberattacks. The design of the firewall or firewall module may include the following. The firewall module may be designed to be able to dig deeper and inspect all information of application fields. Advanced SCADA security features (e.g. algorithms/functions) may be implemented by the firewall module. For example, a sequence check function (or referred to as an Out-of-Sequence Detection Algorithm (OSDA)) may be designed to protect SCADA operations that use consecutive commands. An index-based rules matching optimisation algorithm/function may be designed to reduce potential latency. The capability of the firewall module may be further extended by the addition and inspection of proprietary industrial protocols by designing a protocol creation function (or referred to as Proprietary Industrial Protocol Creation Algorithm (PIPCA)).

Figure 11:
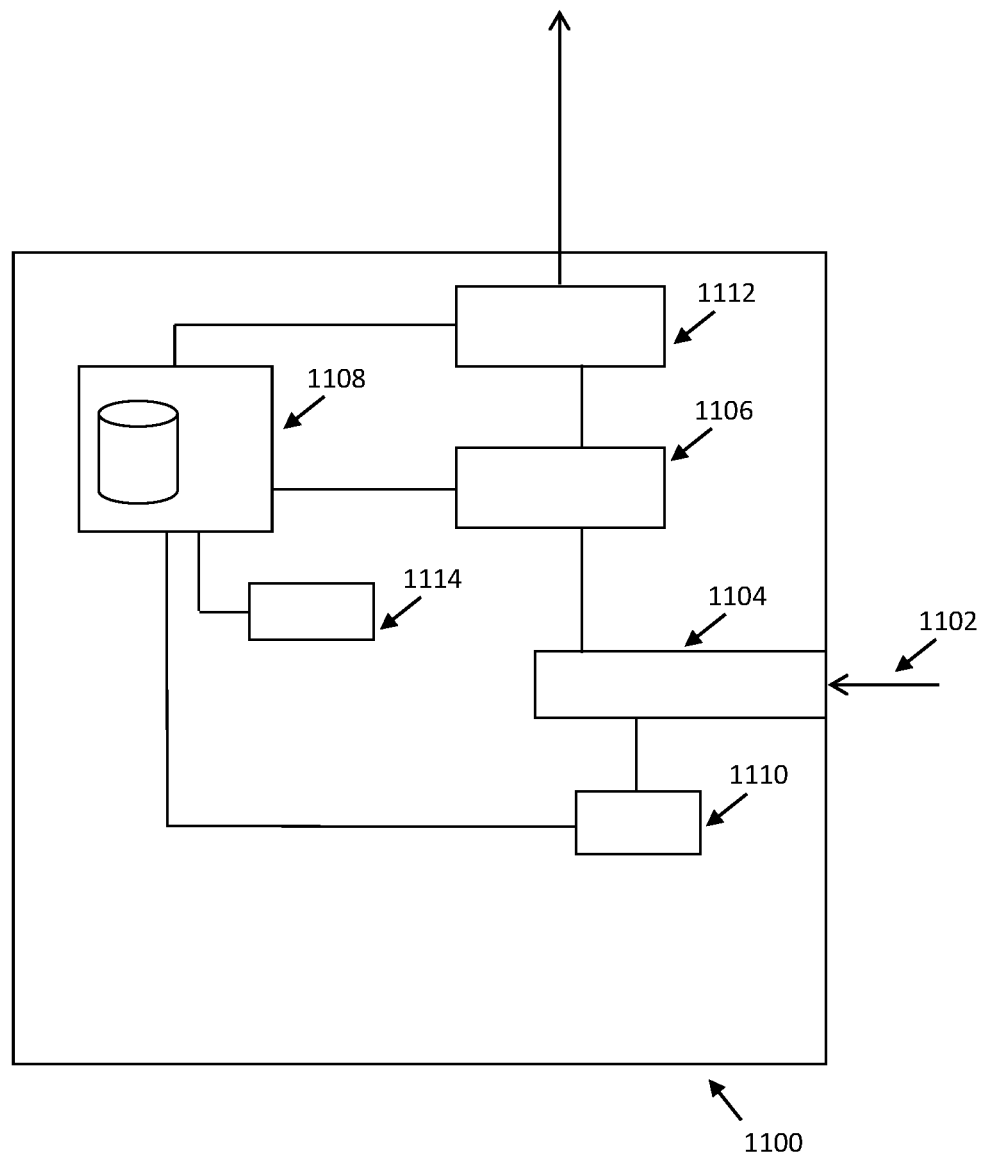
FIG. 11 is a schematic block diagram for illustrating a firewall module in an exemplary embodiment.

FIG. 11 is a schematic block diagram for illustrating a firewall module in an exemplary embodiment.

A firewall module 1100 is provided. The firewall module 1100 may inspect one or more communication packets e.g. 1102 in an industrial control system. The firewall module 1100 comprises a packet accessing component 1104 to access a communication packet e.g. 1102. For example, the communication packet e.g. 1102 may be sent to or from a field interface device of the system.

The firewall module 1100 also comprises an inspection module 1106 that is coupled to the packet accessing component 1104 and is also coupled to a storage component 1108. The storage component 1108 may be internal or external to the firewall module 1100. In some exemplary embodiments, the storage component 1108 may be, but is not limited to, a RAM.

In the exemplary embodiment, the storage component 1108 stores a firewall rules database that in turn stores one or more firewall rules. The inspection module 1106 is configured to access the one or more firewall rules based on an industrial protocol associated with the communication packet. The inspection module 1106 is configured to perform a comprehensive inspection of all header fields and data fields of the communication packet based on the one or more firewall rules accessed based on the industrial protocol associated with the communication packet.

In the exemplary embodiment, optionally, the firewall module 1100 may comprise a preliminary detection module 1110. The preliminary detection module 1110 is coupled to the packet accessing component 1104 and is also coupled to the storage component 1108. The preliminary detection module 1110 is configured to access network layer information and a protocol packet format based on the industrial protocol associated with the communication packet e.g. 1102. The preliminary detection module 1110 is further configured to perform an inspection of the communication packet e.g. 1102 based on the network layer information and the protocol packet format based on the industrial protocol associated with the communication packet e.g. 1102. In the exemplary embodiment, the network layer information and the protocol packet format based on the industrial protocol associated with the communication packet e.g. 1102 may be stored in the storage component 1108 e.g. in the firewall rules database. The inspection by the preliminary detection module 1110 may be before the comprehensive inspection performed by the inspection module 1106. In some exemplary embodiments, the inspection module 1106 may conduct the preliminary inspection prior to the comprehensive inspection.

In the exemplary embodiment, optionally, the firewall module 1100 may comprise a sequence check module 1112. The sequence check module 1112 is coupled to the inspection module 1106 and is also coupled to the storage component 1108. The sequence check module 1112 may access a sequence check database that may be stored in the storage component 1108. The sequence check database may store one or more legal sequences, each legal sequence comprising a sequential order of at least two known commands. The sequence check database may also store one or more sequence states or the statuses of a legal sequence. In such an arrangement, the inspection module 1106 is configured to identify whether the communication packet e.g. 1102 is a sequence-oriented communication packet based on the comprehensive inspection, the identification being based on the at least two known commands. For example, the comparison may be using the tags of the communication packet e.g. 1102 against the tags of the known commands. If the communication packet is identified as a sequence-oriented communication packet, the sequence check module 1112 is configured to access the one or more legal sequences to determine whether the communication packet e.g. 1102 is in accordance with at least one legal sequence, the determination being based on one or more sequence states of any preceding communication packet that is in accordance with the at least one legal sequence.

For example, for a second command CMD #2, the sequence check module 1112 may check for the sequence state of a preceding command CMD #1. As another example, the determination may also be such that there is no preceding communication packet, e.g. for a first command CMD #1 of a sequence, the sequence check module 1112 may check for the sequence state of any preceding command and determine that CMD #1 is the first command of the sequence. It will be appreciated that the word "any" is chosen for use here because it is possible for a first command of a legal sequence to be identified/determined to be a part of (or the beginning of) a legal sequence.

In the exemplary embodiment, optionally, the sequence check module 1112 may be configured to allow addition of a new legal sequence to the sequence check database. For example, a user may use a graphical user interface (GUI) available at a control centre to add or edit a legal sequence, and to save the legal sequence to the sequence check database.

In the exemplary embodiment, optionally, the storage component 1108 may store one or more pre-defined critical states of the industrial control system. The critical states may be stored in the firewall rules database. The inspection module 1106 may be configured to determine one or more instructed states of the industrial control system based on the comprehensive inspection. The inspection module 1106 may then monitor a difference or a distance between the one or more instructed states and the one or more pre-defined critical states.

Furthermore, the inspection module 1106 may determine whether there is an abnormal activity of the communication packet e.g. 1102 based on the comprehensive inspection and based on any preceding communication packet assessed by the firewall module.

In the exemplary embodiment, optionally, the one or more firewall rules may be sorted according to an indexing technique. The firewall rules database may be capable of conducting the sorting and to store the sorted one or more firewall rules. Furthermore, optionally, the firewall rules database may be configured to store the sorted one or more firewall rules as one or more index trees, each index tree being associated with an industrial protocol.

In the exemplary embodiment, optionally, the firewall module 1100 may comprise a protocol creation module 1114 coupled to the storage component 1108. The protocol creation module 1114 may allow creation of a new industrial protocol. The protocol creation module 1114 may also allow editing of the one or more firewall rules. Created industrial protocol and/or edited firewall rules may be stored in the firewall rules database. For example, a user may use a graphical user interface (GUI) available at a control centre to create a new industrial protocol or to edit one or more firewall rules, and to save the creation and/or editing to the firewall rules database.

Figure 12:
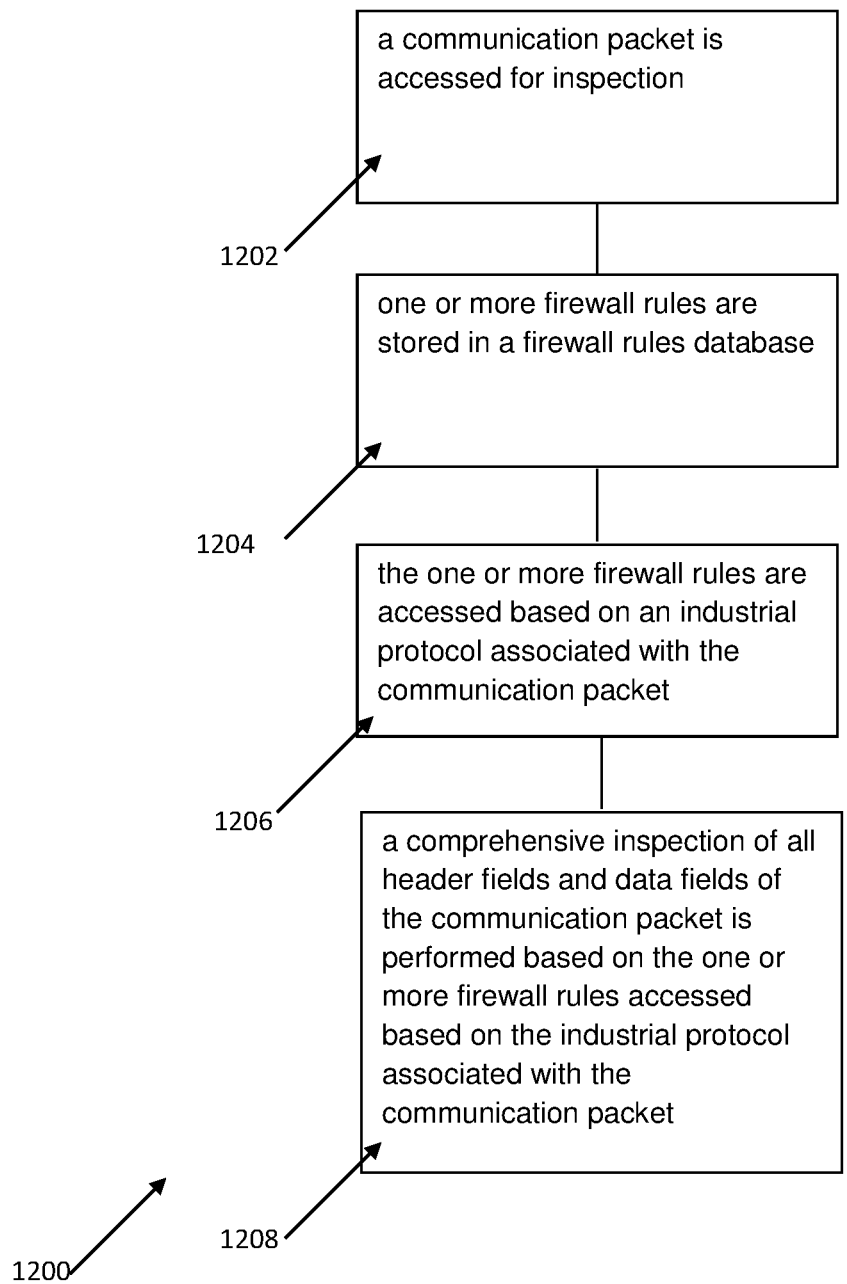
FIG. 12 is a schematic flowchart for illustrating a method of inspecting one or more communication packets in an industrial control system in an exemplary embodiment.

FIG. 12 is a schematic flowchart 1200 for illustrating a method of inspecting one or more communication packets in an industrial control system in an exemplary embodiment.

At step 1202, a communication packet is accessed for inspection. At step 1204, one or more firewall rules are stored in a firewall rules database. At step 1206, the one or more firewall rules are accessed based on an industrial protocol associated with the communication packet. At step 1208, a comprehensive inspection of all header fields and data fields of the communication packet is performed based on the one or more firewall rules accessed based on the industrial protocol associated with the communication packet.

Figure 10:
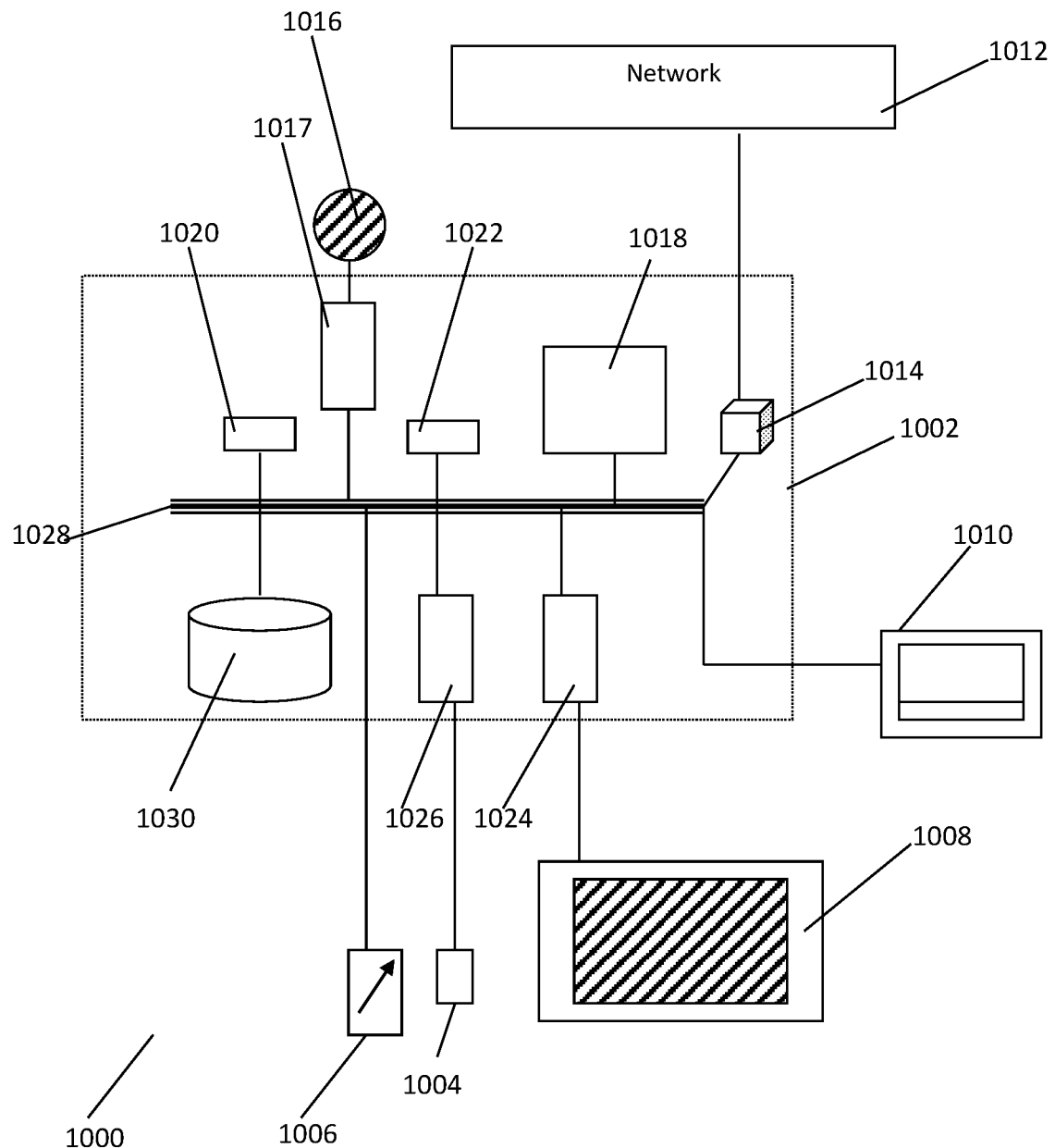
FIG. 10 is a schematic drawing of a computer system suitable for implementing an exemplary embodiment.

Different exemplary embodiments can be implemented in the context of data structure, program modules, program and computer instructions executed in a computer implemented environment. A general purpose computing environment is briefly disclosed herein. One or more exemplary embodiments may be embodied in one or more computer systems, such as is schematically illustrated in FIG. 10.

One or more exemplary embodiments may be implemented as software, such as a computer program being executed within a computer system 1000, and instructing the computer system 1000 to conduct a method of an exemplary embodiment.

The computer system 1000 comprises a computer unit 1002, input modules such as a keyboard 1004 and a pointing device 1006 and a plurality of output devices such as a display 1008, and printer 1010. A user can interact with the computer unit 1002 using the above devices. The pointing device can be implemented with a mouse, track ball, pen device or any similar device. One or more other input devices (not shown) such as a joystick, game pad, satellite dish, scanner, touch sensitive screen or the like can also be connected to the computer unit 1002. The display 1008 may include a cathode ray tube (CRT), liquid crystal display (LCD), field emission display (FED), plasma display or any other device that produces an image that is viewable by the user.

The computer unit 1002 can be connected to a computer network 1012 via a suitable transceiver device 1014, to enable access to e.g. the Internet or other network systems such as Local Area Network (LAN) or Wide Area Network (WAN) or a personal network. The network 1012 can comprise a server, a router, a network personal computer, a peer device or other common network node, a wireless telephone or wireless personal digital assistant. Networking environments may be found in offices, enterprise-wide computer networks and home computer systems etc. The transceiver device 1014 can be a modem/router unit located within or external to the computer unit 1002, and may be any type of modem/router such as a cable modem or a satellite modem.

It will be appreciated that network connections shown are exemplary and other ways of establishing a communications link between computers can be used. The existence of any of various protocols, such as TCP/IP, Frame Relay, Ethernet, FTP, HTTP and the like, is presumed, and the computer unit 1002 can be operated in a client-server configuration to permit a user to retrieve web pages from a web-based server. Furthermore, any of various web browsers can be used to display and manipulate data on web pages.

The computer unit 1002 in the example comprises a processor 1018, a Random Access Memory (RAM) 1020 and a Read Only Memory (ROM) 1022. The ROM 1022 can be a system memory storing basic input/ output system (BIOS) information. The RAM 1020 can store one or more program modules such as operating systems, application programs and program data.

The computer unit 1002 further comprises a number of Input/Output (I/O) interface units, for example I/O interface unit 1024 to the display 1008, and I/O interface unit 1026 to the keyboard 1004. The components of the computer unit 1002 typically communicate and interface/couple connectedly via an interconnected system bus 1028 and in a manner known to the person skilled in the relevant art. The bus 1028 can be any of several types of bus structures including a memory bus or memory controller, a peripheral bus, and a local bus using any of a variety of bus architectures.

It will be appreciated that other devices can also be connected to the system bus 1028. For example, a universal serial bus (USB) interface can be used for coupling a video or digital camera to the system bus 1028. An IEEE 1394 interface may be used to couple additional devices to the computer unit 1002. Other manufacturer interfaces are also possible such as FireWire developed by Apple Computer and i.Link developed by Sony. Coupling of devices to the system bus 1028 can also be via a parallel port, a game port, a PCI board or any other interface used to couple an input device to a computer. It will also be appreciated that, while the components are not shown in the figure, sound/audio can be recorded and reproduced with a microphone and a speaker. A sound card may be used to couple a microphone and a speaker to the system bus 1028. It will be appreciated that several peripheral devices can be coupled to the system bus 1028 via alternative interfaces simultaneously.

An application program can be supplied to the user of the computer system 1000 being encoded/stored on a data storage medium such as a CD-ROM or flash memory carrier. The application program can be read using a corresponding data storage medium drive of a data storage device 1030. The data storage medium is not limited to being portable and can include instances of being embedded in the computer unit 1002. The data storage device 1030 can comprise a hard disk interface unit and/or a removable memory interface unit (both not shown in detail) respectively coupling a hard disk drive and/or a removable memory drive to the system bus 1028. This can enable reading/writing of data. Examples of removable memory drives include magnetic disk drives and optical disk drives. The drives and their associated computer-readable media, such as a floppy disk provide non-volatile storage of computer readable instructions, data structures, program modules and other data for the computer unit 1002. It will be appreciated that the computer unit 1002 may include several of such drives. Furthermore, the computer unit 1002 may include drives for interfacing with other types of computer readable media.

The application program is read and controlled in its execution by the processor 1018. Intermediate storage of program data may be accomplished using RAM 1020. The method(s) of the exemplary embodiments can be implemented as computer readable instructions, computer executable components, or software modules. One or more software modules may alternatively be used. These can include an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings herein.

The operation of the computer unit 1002 can be controlled by a variety of different program modules. Examples of program modules are routines, programs, objects, components, data structures, libraries, etc. that perform particular tasks or implement particular abstract data types. The exemplary embodiments may also be practiced with other computer system configurations, including handheld devices, multiprocessor systems, microprocessor-based or programmable consumer electronics, network PCs, minicomputers, mainframe computers, personal digital assistants, mobile telephones and the like. Furthermore, the exemplary embodiments may also be practiced in distributed computing environments where tasks are performed by remote processing devices that are linked through a wireless or wired communications network. In a distributed computing environment, program modules may be located in both local and remote memory storage devices.

The exemplary embodiments may also be practiced with other computer system configurations, including handheld devices, multiprocessor systems/servers, microprocessor-based or programmable consumer electronics, network PCs, minicomputers, mainframe computers, personal digital assistants, mobile telephones and the like. Furthermore, the exemplary embodiments may also be practiced in distributed computing environments where tasks are performed by remote processing devices that are linked through a wireless or wired communications network. In a distributed computing environment, program modules may be located in both local and remote memory storage devices.

The terms "coupled" or "connected" as used in this description are intended to cover both directly connected or connected through one or more intermediate means, unless otherwise stated.

The description herein may be, in certain portions, explicitly or implicitly described as algorithms and/or functional operations that operate on data within a computer memory or an electronic circuit. These algorithmic descriptions and/or functional operations are usually used by those skilled in the information/data processing arts for efficient description. An algorithm is generally relating to a self-consistent sequence of steps leading to a desired result. The algorithmic steps can include physical manipulations of physical quantities, such as electrical, magnetic or optical signals capable of being stored, transmitted, transferred, combined, compared, and otherwise manipulated.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

The description also discloses relevant device/apparatus for performing the steps of the described methods. Such apparatus may be specifically constructed for the purposes of the methods, or may comprise a general purpose computer/processor or other device selectively activated or reconfigured by a computer program stored in a storage member.

The algorithms and displays described herein are not inherently related to any particular computer or other apparatus. It is understood that general purpose devices/machines may be used in accordance with the teachings herein. Alternatively, the construction of a specialized device/apparatus to perform the method steps may be desired.

In addition, it is submitted that the description also implicitly covers a computer program, in that it would be clear that the steps of the methods described herein may be put into effect by computer code. It will be appreciated that a large variety of programming languages and coding can be used to implement the teachings of the description herein. Moreover, the computer program if applicable is not limited to any particular control flow and can use different control flows without departing from the scope of the invention.

Furthermore, one or more of the steps of the computer program if applicable may be performed in parallel and/or sequentially. Such a computer program if applicable may be stored on any computer readable medium. The computer readable medium may include storage devices such as magnetic or optical disks, memory chips, or other storage devices suitable for interfacing with a suitable reader/general purpose computer. In such instances, the computer readable storage medium is non-transitory. Such storage medium also covers all computer-readable media e.g. medium that stores data only for short periods of time and/or only in the presence of power, such as register memory, processor cache and Random Access Memory (RAM) and the like. The computer readable medium may even include a wired medium such as exemplified in the Internet system, or wireless medium such as exemplified in bluetooth technology. The computer program when loaded and executed on a suitable reader effectively results in an apparatus that can implement the steps of the described methods.

The exemplary embodiments may also be implemented as hardware modules. A module is a functional hardware unit designed for use with other components or modules. For example, a module may be implemented using digital or discrete electronic components, or it can form a portion of an entire electronic circuit such as an Application Specific Integrated Circuit (ASIC). A person skilled in the art will understand that the exemplary embodiments can also be implemented as a combination of hardware and software modules.

Additionally, when describing some embodiments, the disclosure may have disclosed a method and/or process as a particular sequence of steps. However, unless otherwise required, it will be appreciated the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For an example, when "comprising" is used, reference to a "one" feature is also intended to be a reference to "at least one" of that feature. Terms such as "consisting", "consist", and the like, may, in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

In the exemplary embodiments, various databases and libraries have been described. For example, there may have been described a firewall rules database to store one or more firewall rules, and/or industrial protocols. A database may be provided to store legal sequences and/or sequence states. A database may be provided to store pre-defined critical states and current instructed states. A database may be provided to store historical packets/commands to detecting anomaly activities. legal sequences and/or sequence states. It will be appreciated that the databases are not limited as such. For example, it is possible for a single database to be provided to store all information. For example, it is possible to have one or more databases to store one or more of the information.

Next, in the exemplary embodiments, although a SCADA system is used as an example, it will be appreciated that the exemplary embodiments may be applicable to any other industrial control systems.

In the exemplary embodiments, various modules have been described. It will be appreciated that the modules are not limited to any form. For example, a module may be a software module, a hardware module or a combination of both software and hardware module. For example, the firewall module may be a set-top box that is pluggable into an industrial control system to inspect the communication packets of the system.

Further, it will be appreciated that the present disclosure also provides for a non-transitory tangible computer readable storage medium having stored thereon software instructions or code that, when executed by a processor of an industrial control system, cause the processor to perform a method of inspecting one or more communication packets in an industrial control system, by executing the steps comprising accessing a communication packet for inspection; storing one or more firewall rules in a firewall rules database; accessing the one or more firewall rules based on an industrial protocol associated with the communication packet; and performing a comprehensive inspection of all header fields and data fields of the communication packet based on the one or more firewall rules accessed based on the industrial protocol associated with the communication packet. The processor may also execute any steps that have been described in the present disclosure, and these steps may be stored as software instructions or code on the storage medium.

It will be appreciated by a person skilled in the art that other variations and/or modifications may be made to the specific embodiments without departing from the scope of the invention as broadly described. For example, in the description herein, features of different exemplary embodiments may be mixed, combined, interchanged, incorporated, adopted, modified, included etc. or the like across different exemplary embodiments. The present embodiments are, therefore, to be considered in all respects to be illustrative and not restrictive.

The invention claimed is:

1. An industrial control system comprising:
   a control centre;
   one or more field interface devices;
   a communication network to facilitate communications between the control centre and the one or more field interface devices;
   the control centre comprising a processor and a memory storing instructions that when executed by the processor, provide:
   a firewall module coupled to the communication network, the firewall module comprising,
      a packet accessing component to access a communication packet sent through the firewall module and being transmitted to or from the one or more field interface devices and the control centre;
      a firewall rules database, the firewall rules database storing one or more firewall rules, the one or more firewall rules being based on one or more industrial protocols and for each industrial protocol, the one or more firewall rules include valid values of all header fields and data fields of the each industrial protocol;
      a preliminary detection module to access network layer information and a protocol packet format from the one or more firewall rules based on an industrial protocol of the communication packet, the preliminary detection module to perform a check on the network layer information and the protocol packet format of the communication packet based on the industrial protocol of the communication packet, and the preliminary detection module is arranged to reject the communication packet if the network layer information and the protocol packet format of the communication packet fails the check;
      an inspection module to access the one or more firewall rules based on the industrial protocol of the communication packet;
      the inspection module to perform a comprehensive inspection of all header fields and data fields of the communication packet, the comprehensive inspection including a determination of whether one or more values of the data fields of the communication packet is invalid, said determination based on the one or more firewall rules accessed based on the industrial protocol of the communication packet; and
      wherein the inspection module is arranged to reject the communication packet if the one or more values of the data payload is invalid.

2. The industrial control system as claimed in claim 1, the firewall module comprising,
   a sequence check module, the sequence check module coupled to the inspection module;
   a sequence check database, the sequence check database configured to store one or more legal sequences, each legal sequence comprising a sequential order of at least two known commands;
   wherein the inspection module is configured to identify whether the communication packet is a sequence-oriented communication packet based on the comprehensive inspection, the identification being based on the at least two known commands; and
   wherein if the communication packet is identified as a sequence-oriented communication packet, the sequence check module is configured to access the one or more legal sequences to determine whether the communication packet is in accordance with at least one legal sequence, the determination being based on one or more sequence states of any preceding communication packet that is in accordance with the at least one legal sequence.

3. The industrial control system as claimed in claim 2, further comprising the sequence check database being configured to store the one or more sequence states of any preceding communication packet that is in accordance with the at least one legal sequence.

4. The industrial control system as claimed in claim 2, further comprising the sequence check module being configured to allow addition of a new legal sequence to the sequence check database.

5. The industrial control system as claimed in claim 1, further comprising the firewall rules database being configured to store one or more pre-defined critical states of the industrial control system;
   the inspection module is further configured to determine one or more instructed states of the industrial control system based on the comprehensive inspection;
   and the inspection module is configured to monitor a difference between the one or more instructed states and the one or more pre-defined critical states.

6. The industrial control system as claimed in claim 1, further comprising the inspection module being further configured to determine whether there is an abnormal activity of the communication packet based on the comprehensive inspection and based on any preceding communication packet assessed by the firewall module.

7. The industrial control system as claimed in claim 1, further comprising the firewall rules database being configured to sort the one or more firewall rules using an index; the inspection module being further configured to perform the comprehensive inspection of the all header fields and data fields of the communication packet based on using the index.

8. The industrial control system as claimed in claim 7, further comprising the firewall rules database being configured to store the sorted one or more firewall rules as one or more index trees, each index tree being associated with an industrial protocol.

9. The industrial control system as claimed in claim 1, further comprising a protocol creation module coupled to the firewall rules database, the protocol creation module being configured to allow creation of a new industrial protocol for addition to the firewall rules database.

10. The industrial control system as claimed in claim 1, wherein the industrial control system is a Supervisory Control and Data Acquisition (SCADA) system, the one or more industrial protocols are one or more SCADA industrial protocols, and the industrial protocol of the communication packet is a SCADA industrial protocol of the communication packet.

11. A method of inspecting one or more communication packets in an industrial control system that comprises a control centre; one or more field interface devices; and a communication network to facilitate communications between the control centre and the one or more field interface devices, the method comprising,
providing a firewall module;
coupling the firewall module to the communication network;
accessing a communication packet sent through the firewall module for inspection, the communication packet being transmitted to or from the one or more field interface devices and the control centre;
storing one or more firewall rules in a firewall rules database, the one or more firewall rules being based on one or more industrial protocols and for each industrial protocol, the one or more firewall rules include valid values of all header fields and data fields of the each industrial protocol;
accessing the one or more firewall rules based on an industrial protocol of the communication packet;
accessing network layer information and a protocol packet format from the one or more firewall rules format based on the industrial protocol of the communication packet
performing a check on the network layer information and the protocol packet format of the communication packet based on the industrial protocol of the communication packet and if the network layer information and the protocol packet format of the communication packet fails the check, rejecting the communication packet;
performing a comprehensive inspection of all header fields and data fields of the communication packet, the comprehensive inspection including determining whether one or more values of the data fields of the communication packet is invalid, said determination based on the one or more firewall rules accessed based on the industrial protocol of the communication packet and if the one or more values of the data payload is invalid, rejecting the communication packet.

12. The method as claimed in claim 11, the method comprising,
storing one or more legal sequences in a sequence check database, each legal sequence comprising a sequential order of at least two known commands;
identifying whether the communication packet is a sequence-oriented communication packet based on the comprehensive inspection, the identification being based on the at least two known commands; and
if the communication packet is identified as a sequence-oriented communication packet, accessing the one or more legal sequences to determine whether the communication packet is in accordance with at least one legal sequence, the determination being based on one or more sequence states of any preceding communication packet that is in accordance with the at least one legal sequence.

13. The method as claimed in claim 12, further comprising storing the one or more sequence states of any preceding communication packet that is in accordance with the at least one legal sequence.

14. The method as claimed in claim 12, further comprising allowing addition of a new legal sequence to the sequence check database.

15. The method as claimed in claim 11, further comprising storing one or more pre-defined critical states of the industrial control system in the firewall rules database;
determining one or more instructed states of the industrial control system based on the comprehensive inspection;
and monitoring a difference between the one or more instructed states and the one or more pre-defined critical states.

16. The method as claimed in claim 11, further comprising determining whether there is an abnormal activity of the communication packet based on the comprehensive inspection and based on any preceding communication packet assessed by the firewall module.

17. The method as claimed in claim 11, further comprising sorting the one or more firewall rules using an index;
using the index to perform the comprehensive inspection of the all header fields and data fields of the communication packet based on.

18. The method as claimed in claim 17, further comprising storing the sorted one or more firewall rules as one or more index trees in the firewall rules database, each index tree being associated with an industrial protocol.

19. The method as claimed in claim 11, further comprising allowing creation of a new industrial protocol for addition to the firewall rules database.

20. The method as claimed in claim 11, wherein the industrial control system is a Supervisory Control and Data Acquisition (SCADA) system, the one or more industrial protocols are one or more SCADA industrial protocols, and the industrial protocol of the communication packet is a SCADA industrial protocol of the communication packet.

* * * * *